United States Patent
Matsumoto

(10) Patent No.: US 11,566,804 B2
(45) Date of Patent: Jan. 31, 2023

(54) CONTROL SYSTEM, AIR CONDITIONER, AND CONTROL METHOD BASED ON LIFESTYLE LOG

(71) Applicant: Mitsubishi Electric Corporation, Tokyo (JP)

(72) Inventor: Takashi Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 17 days.

(21) Appl. No.: 17/269,168

(22) PCT Filed: Jan. 16, 2019

(86) PCT No.: PCT/JP2019/000993
§ 371 (c)(1),
(2) Date: Feb. 17, 2021

(87) PCT Pub. No.: WO2020/044588
PCT Pub. Date: Mar. 5, 2020

(65) Prior Publication Data
US 2021/0247085 A1  Aug. 12, 2021

(30) Foreign Application Priority Data
Aug. 27, 2018  (WO) .................. PCT/JP2018/031531

(51) Int. Cl.
*F24F 11/30* (2018.01)
*F24F 11/523* (2018.01)
(Continued)

(52) U.S. Cl.
CPC ............ *F24F 11/30* (2018.01); *F24F 11/523* (2018.01); *F24F 11/58* (2018.01); *F24F 11/64* (2018.01);
(Continued)

(58) Field of Classification Search
None
See application file for complete search history.

(56) References Cited

U.S. PATENT DOCUMENTS

2003/0033392 A1  2/2003  Nakamura et al.
2010/0289643 A1* 11/2010  Trundle ................. G05B 15/02
340/3.1
(Continued)

FOREIGN PATENT DOCUMENTS

JP    H10-232044 A    9/1998
JP    2003-056889 A   2/2003
(Continued)

OTHER PUBLICATIONS

International Search Report of the International Searching Authority dated Feb. 19, 2019 for the corresponding International application No. PCT/JP2019/000993 (and English translation).

(Continued)

*Primary Examiner* — Nathan L Laughlin
(74) *Attorney, Agent, or Firm* — Posz Law Group, PLC

(57) ABSTRACT

A control system has an air conditioner that communicates with a file server via a network. The file server includes a lifestyle log in which information associating lifestyle information indicating a lifestyle with a control method of the air conditioner is accumulated. A first control-operation functional unit operates the air conditioner based on a first control request acquired from a first device. A second control-operation functional unit selects a control method from the lifestyle log based on a second control request acquired from a second device with higher functionality than the first device, and operates the air conditioner using the selected control method.

20 Claims, 17 Drawing Sheets

(51) Int. Cl.
  *F24F 11/80* (2018.01)
  *F24F 11/64* (2018.01)
  *F24F 11/65* (2018.01)
  *F24F 11/58* (2018.01)
  *G05B 19/042* (2006.01)
  *F24F 140/60* (2018.01)
  *F24F 120/20* (2018.01)
  *F24F 140/50* (2018.01)
  *F24F 120/12* (2018.01)

(52) U.S. Cl.
  CPC ............. *F24F 11/65* (2018.01); *F24F 11/80* (2018.01); *G05B 19/042* (2013.01); *F24F 2120/12* (2018.01); *F24F 2120/20* (2018.01); *F24F 2140/50* (2018.01); *F24F 2140/60* (2018.01); *G05B 2219/2614* (2013.01)

(56) References Cited

U.S. PATENT DOCUMENTS

| | | | |
|---|---|---|---|
| 2015/0223659 A1 | 8/2015 | Han et al. | |
| 2016/0261425 A1* | 9/2016 | Horton | H04L 63/08 |
| 2017/0138625 A1 | 5/2017 | Shiratori | |
| 2017/0264979 A1* | 9/2017 | Masuda | G08C 17/00 |
| 2018/0357547 A1* | 12/2018 | Yamada | H04L 67/12 |
| 2019/0041080 A1* | 2/2019 | Higuchi | H04W 4/38 |
| 2020/0088435 A1* | 3/2020 | Inoue | F24F 11/56 |
| 2021/0156585 A1* | 5/2021 | Kido | F24F 11/65 |

FOREIGN PATENT DOCUMENTS

| | | |
|---|---|---|
| JP | 2010-151342 A | 7/2010 |
| JP | 2014-001907 A | 1/2014 |
| JP | 2015-078802 A | 4/2015 |
| JP | 2015-078826 A | 4/2015 |
| JP | 2015-114031 A | 6/2015 |
| JP | 2015-172443 A | 10/2015 |
| JP | 2015-224858 A | 12/2015 |
| JP | 2018-021710 A | 2/2018 |
| KR | 10-2018-0089660 A | 8/2018 |

OTHER PUBLICATIONS

International Search Report of the International Searching Authority dated Oct. 16, 2018 for the corresponding International application No. PCT/JP2018/031531 (and English translation).

Chinese Office Action dated Sep. 17, 2021 in corresponding CN Application No. 201980055061.9 and machine English translation thereof.

Office Action dated Jun. 15, 2021 issued in corresponding JP application No. 2020-540022 (and English translation).

* cited by examiner

Fig. 8

71: REQUEST ACCEPTANCE SCREEN

| | | | |
|---|---|---|---|
| ☐ OPERATION TYPE | ☐ TEMPERATURE CONTROL | ☐ ENTER CONDITIONS | |
| ☑ COOLING | | 1 | 27.5°C ▷ |
| ☐ HEATING | | 2 | 24.5°C ▷ |
| ☐ DRY | | | |

| | ☐ AIR FLOW DIRECTION CONTROL | ☐ ENTER CONDITIONS | |
|---|---|---|---|
| | | 1 | 80-DEGREE ANGLE TO THE SOUTHWEST ▷ |
| | | 2 | 80-DEGREE ANGLE TO THE NORTHEAST ▷ |

| | ☐ AIR VOLUME CONTROL | ☐ ENTER CONDITIONS | |
|---|---|---|---|
| | | 1 | STRONG AIR FLOW ▷ |
| | | 2 | ▷ |

| | ☐ OPERATION CONTROL | | |
|---|---|---|---|
| | | 1 | 9:00~15:00 : TEMPERATURE CONDITION 1 & AIR FLOW DIRECTION CONDITION 1 ▷ |
| | | 2 | 20:00~20:20 : TEMPERATURE CONDITION 2 & AIR FLOW DIRECTION CONDITION 1 ▷ |

TRANSMIT    CANCEL

Fig. 9

| LIFE ID | LIFESTYLE INFORMATION | CONTROL METHOD | | | | | |
|---|---|---|---|---|---|---|---|
| | | OPERATION TYPE | TEMPERATURE CONTROL | AIR FLOW DIRECTION CONTROL | AIR VOLUME CONTROL | TIMER CONTROL | OPERATION CONTROL |
| ... | ... | ... | ... | ... | ... | ... | ... |

211 — LIFE ID
212 — LIFESTYLE INFORMATION
213 — CONTROL METHOD
21: LIFESTYLE LOG

Fig.14

| SELECTION | LIFESTYLE INFORMATION | CONTROL METHOD ||||||
|---|---|---|---|---|---|---|
| | | OPERATION TYPE | TEMPERATURE CONTROL | AIR FLOW DIRECTION CONTROL | AIR VOLUME CONTROL | TIMER CONTROL | OPERATION CONTROL |
| ✓ | | | | | | | |
| ... | ... | ... | ... | ... | ... | ... | ... |

72: SELECTION SCREEN

66: CONTROL METHOD CANDIDATES

CONFIRM  CANCEL

Fig.17

| LIFE ID | LIFESTYLE INFORMATION | CONTROL METHOD | | | | |
|---|---|---|---|---|---|---|
| | | TELEVISION | LIGHTING EQUIPMENT | MICROWAVE OVEN | VENTILATION FAN | WATER HEATER |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

21b: LIFESTYLE LOG

CONTROL SYSTEM, AIR CONDITIONER, AND CONTROL METHOD BASED ON LIFESTYLE LOG

CROSS REFERENCE TO RELATED APPLICATIONS

This application is a U.S. national stage application of PCT/JP2019/000993, filed on Jan. 16, 2019, which is based on International Application No. PCT/JP2018/031531, filed on Aug. 27, 2018, the contents of which are incorporated herein by reference.

TECHNICAL FIELD

The present invention relates to a control system, an air conditioner, and a control method.

BACKGROUND

Compared with those in the past, current air conditioners have capabilities that allow various types of operation, such as an extended variable range of capacity, an extended variable range of air flow speed, and diversified air flow control. However, even in an air conditioner that allows various types of operation, the details of operation that can be requested by a user through the air conditioner itself or a remote controller are restricted due to the number of control-operation switches or physical restrictions in a display unit.

Patent Literature 1 discloses a technology in which, in an air conditioner, a control command from a remote controller dedicated to the air conditioner and a control command from a communication terminal via a wireless local area network (LAN) are executed.

Patent Literature

Patent Literature 1: JP 2018-021710 A

In the technology described in Patent Literature 1, even in the case of a control command from the communication terminal via the wireless LAN, the details of this control command are control within the range that can be operated with the remote controller. Therefore, even in the air conditioner that allows various types of operation, a problem that remains is that the details of operation that can be requested are restricted. In most cases, the user does not know how to utilize many functions of the air conditioner, so that it is difficult to request operation control outside the range that can be operated with the remote controller. In other cases, the user may request operation control beyond the capabilities of the air conditioner.

SUMMARY

It is an object of the present invention to allow a user to easily use capabilities of an air conditioner that allow various types of operation.

A control system according to the present invention includes an air conditioner and a file server, and controls the air conditioner, wherein the file server includes a lifestyle log in which information associating lifestyle information indicating a lifestyle with a control method of the air conditioner is accumulated, and wherein the air conditioner includes:

a first control-operation functional unit to operate the air conditioner based on a first control request acquired from a first device; and a second control-operation functional unit to select a control method from the lifestyle log based on a second control request acquired from a second device with higher functionality than the first device, and operate the air conditioner using the control method that has been selected.

In a control system according to the present invention, a file server has a lifestyle log in which information associating lifestyle information indicating a lifestyle with a control method of an air conditioner is accumulated. A first control-operation functional unit of the air conditioner acquires a first control request from a first device such as the air conditioner itself or a remote controller. The first control-operation functional unit operates the air conditioner based on the first control request. A second control-operation functional unit of the air conditioner acquires a second control request from a second device with higher functionality than the first device. The second control-operation functional unit selects a control method from the lifestyle log based on the second control request, and operates the air conditioner using the selected control method. Therefore, according to the present invention, it is possible to allow a user to easily use capabilities of the air conditioner that allow various types of operation.

BRIEF DESCRIPTION OF DRAWINGS

FIG. 8 is a diagram illustrating an example of a request acceptance screen according to the first embodiment;

FIG. 9 is a diagram illustrating an example of a lifestyle log according to the first embodiment;

FIG. 14 is a diagram illustrating an example of a selection screen according to the second embodiment;

FIG. 17 is a diagram illustrating an example of a lifestyle log according to the third embodiment.

DETAILED DESCRIPTION

Embodiments of the present invention will be described hereinafter with reference to the drawings. Throughout the drawings, the same or corresponding portions are denoted by the same reference signs. In the description of the embodiments, description of the same or corresponding portions will be omitted or simplified as appropriate. The present invention is not limited to the embodiments to be described hereinafter, and various modifications are possible as required. For example, two or more embodiments of the embodiments to be described hereinafter may be implemented in combination. Alternatively, one embodiment or a combination of two or more embodiments of the embodiments to be described hereinafter may be partially implemented.

First Embodiment

This embodiment will be described with reference to FIGS. 1 to 10.

Description of Configuration

Figure 1:
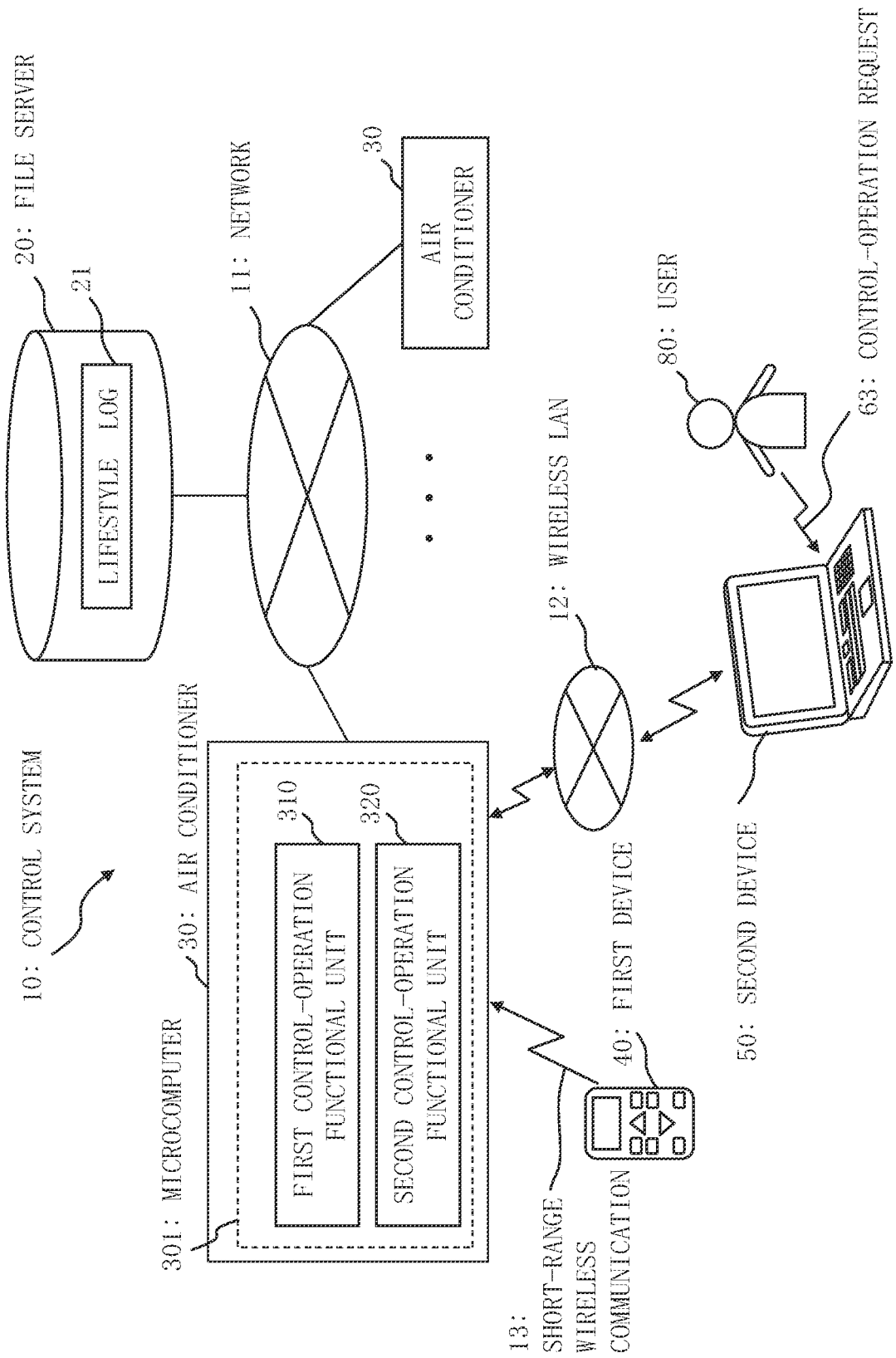
FIG. 1 is a configuration diagram of a control system according to a first embodiment.

FIG. 1 is a diagram illustrating a configuration of a control system 10 according to this embodiment.

The control system 10 has a file server 20 and air conditioners 30. The control system 10 controls the air conditioners 30.

The file server 20 can communicate with each air conditioner 30 via a network 11 such as the Internet. Specifically, the file server 20 is provided in a cloud system. The file server 20 has a lifestyle log 21.

In the lifestyle log 21, information associating lifestyle information indicating a lifestyle with a control method of the air conditioner 30 is accumulated.

The air conditioner 30 is refrigeration cycle equipment that realizes functions such as cooling and heating. The air conditioner 30 includes a microcomputer 301 that controls the refrigeration cycle equipment. The microcomputer 301 includes a first control-operation functional unit 310 and a second control-operation functional unit 320. The first control-operation functional unit 310 controls the air conditioner 30 based on a control command from a first device 40. The second control-operation functional unit 320 controls the air conditioner 30 based on a control command from a second device 50.

The first device 40 transmits a control command to the air conditioner 30, using short-range wireless communication 13 such as infrared communication or Bluetooth (registered trademark). Specifically, the first device 40 is a remote controller. Alternatively, the first device 40 may be a control-operation device, such as a switch, provided in the air conditioner 30.

The second device 50 communicates with the air conditioner 30, using a wireless LAN 12 such as Wi-Fi (registered trademark). Specifically, the second device 50 is a personal computer, a smartphone, a mobile phone, or a tablet computer. The second device 50 is a communication terminal with higher functionality than the first device 40. The second device 50 transmits a control command to the air conditioner 30, using the wireless LAN 12.

The second device 50 accepts a control-operation for the air conditioner 30 that cannot be accepted by the first device 40 from a user 80 as a control-operation request 63.

Figure 2:
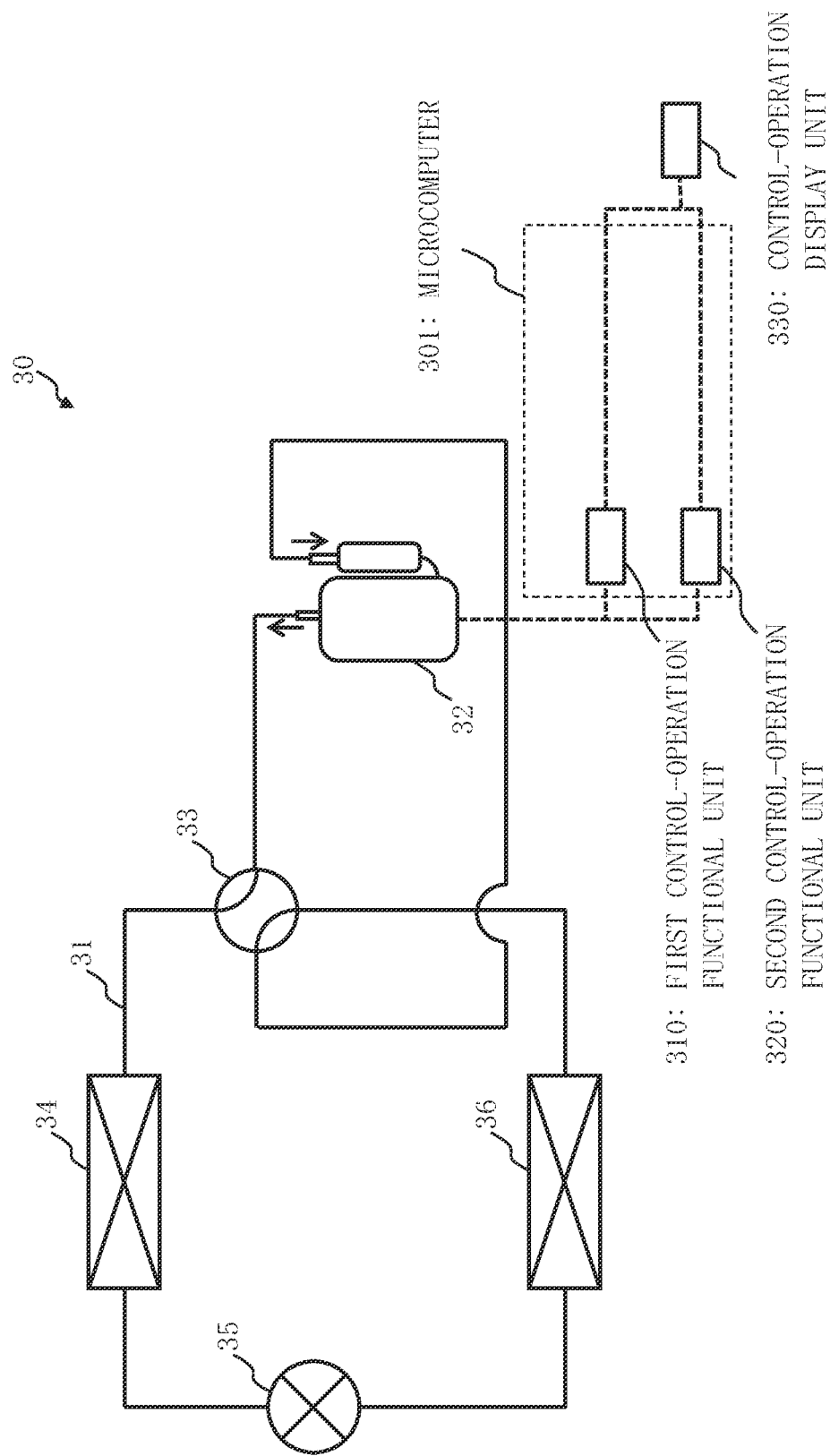
FIG. 2 is a refrigerant circuit during cooling operation of an air conditioner according to the first embodiment.
Figure 3:
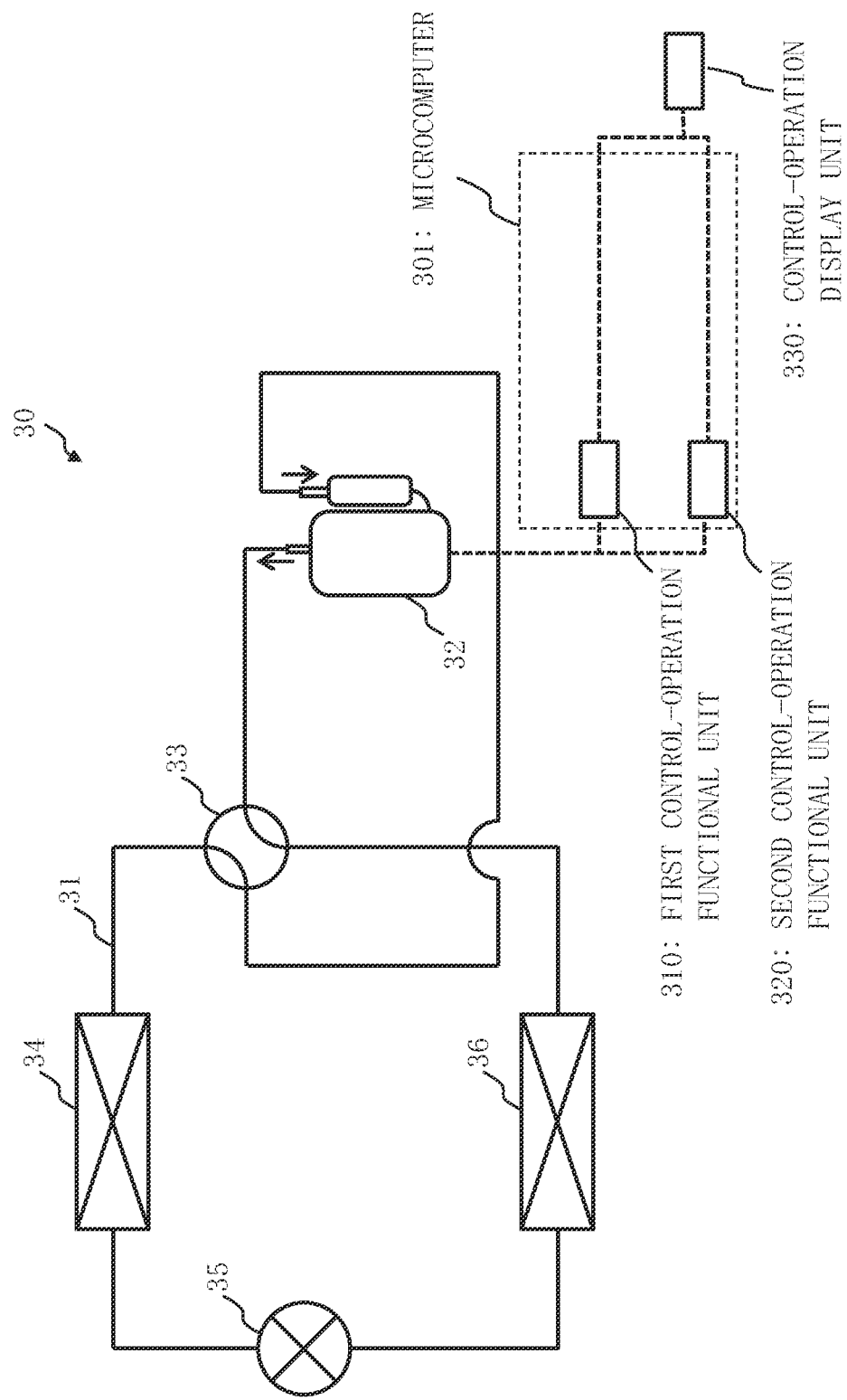
FIG. 3 is the refrigerant circuit during heating operation of the air conditioner according to the first embodiment.

Referring to FIGS. 2 and 3, a configuration of the air conditioner 30 according to this embodiment will be described.

FIG. 2 illustrates a refrigerant circuit 31 during cooling operation. FIG. 3 illustrates the refrigerant circuit 31 during heating operation.

The air conditioner 30 includes the refrigerant circuit 31 in which a refrigerant circulates. The air conditioner 30 further includes a compressor 32, a four-way valve 33, a first heat exchanger 34, which is an outdoor heat exchanger, an expansion mechanism 35, which is an expansion valve, and a second heat exchanger 36, which is an indoor heat exchanger. The compressor 32, the four-way valve 33, the first heat exchanger 34, the expansion mechanism 35, and the second heat exchanger 36 are connected to the refrigerant circuit 31.

The compressor 32 compresses the refrigerant. The four-way valve 33 changes a direction in which the refrigerant flows such that the directions during cooling operation and during heating operation are different from each other. The first heat exchanger 34 operates as a condenser during cooling operation, and causes heat to be dissipated from the refrigerant compressed by the compressor 32. That is, the first heat exchanger 34 performs heat exchange using the refrigerant compressed by the compressor 32. The first heat exchanger 34 operates as an evaporator during heating operation, and performs heat exchange between outdoor air and the refrigerant expanded in the expansion mechanism 35 so as to heat the refrigerant. The expansion mechanism 35 expands the refrigerant from which heat has been dissipated in the condenser. The second heat exchanger 36 operates as a condenser during heating operation, and causes heat to be dissipated from the refrigerant compressed by the compressor 32. That is, the second heat exchanger 36 performs heat exchange using the refrigerant compressed by the compressor 32. The second heat exchanger 36 operates as an evaporator during cooling operation, and performs heat exchange between indoor air and the refrigerant expanded in the expansion mechanism 35 so as to heat the refrigerant.

Specifically, a direct current brushless motor (DC motor) is used as a motor of the compressor, which is driven by an inverter drive device. Each heat exchanger has a fan and a fan motor and uses at least one DC motor.

Each air conditioner 30 further includes the microcomputer 301, which has the first control-operation functional unit 310 and the second control-operation functional unit 320, and a control-operation display unit 330.

The first control-operation functional unit 310 controls the air conditioner 30 based on a control request acquired from the first device 40. The second control-operation functional unit 320 selects a control method from the lifestyle log 21 based on a control request acquired from the second device 50 with higher functionality than the first device 40, and controls the air conditioner 30 using the selected control method.

The control-operation display unit 330 indicates whether the air conditioner 30 is operated by the first device 40 or operated by the second device 50. Being operated by the first device 40 means that the air conditioner 30 is controlled by the first control-operation functional unit 310. Being operated by the second device 50 means that the air conditioner 30 is controlled by the second control-operation functional unit 320. Specifically, the control-operation display unit 330 may distinguish between being operated by the first device 40 and being operated by the second device 50, based on the lighting mode of a light emitting diode (LED) such as turned on, turned off, and flashing, the color of the LED, or the like. Alternatively, the control-operation display unit 330 may include a display, and whether being operated by the first device 40 or being operated by the second device 50 may be displayed on the display.

Although the first control-operation functional unit 310 and the second control-operation functional unit 320 are illustrated as being connected only with the compressor 32, the first control-operation functional unit 310 and the second control-operation functional unit 320 may be connected with not only the compressor 32 but also with a component connected to the refrigerant circuit 31 other than the compressor 32. The first control-operation functional unit 310 and the second control-operation functional unit 320 monitor and control the state of each component connected to the first control-operation functional unit 310 and the second control-operation functional unit 320.

Figure 4:
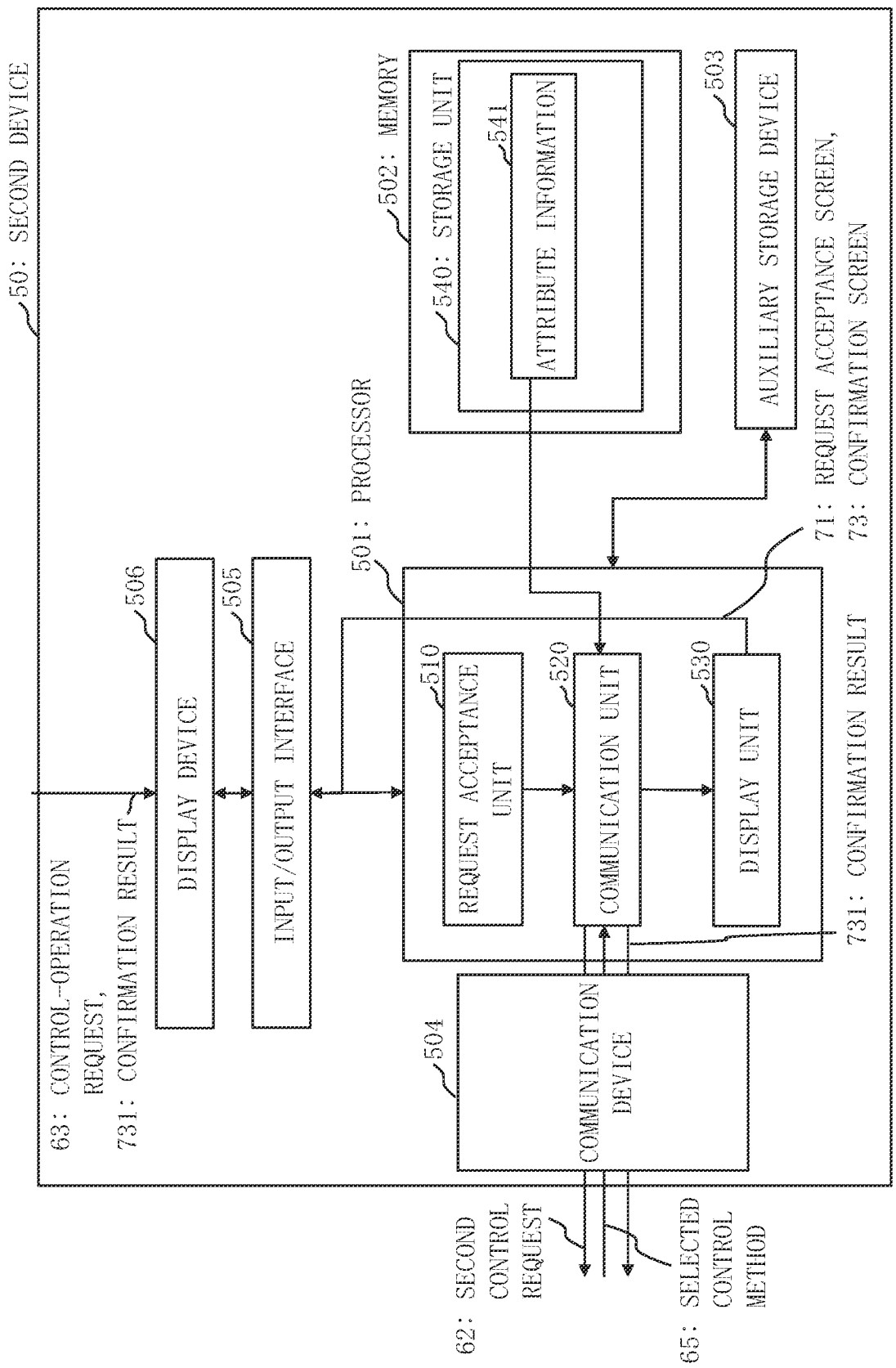
FIG. 4 is a configuration diagram of a second device according to the first embodiment.

FIG. 4 is a diagram illustrating a configuration of the second device 50 according to this embodiment.

The second device 50 is a computer such as a personal computer, a smartphone, a mobile phone, or a tablet. The second device 50 includes a processor 501 and also includes other hardware components such as a memory 502, an auxiliary storage device 503, a communication device 504, and an input/output interface 505. The processor 501 is connected with the other hardware components via signal lines and controls these other hardware components.

The second device 50 includes, as functional elements, a request acceptance unit 510, a communication unit 520, a display unit 530, and a storage unit 540. The storage unit 540 stores attribute information 541.

The functions of the request acceptance unit 510, the communication unit 520, and the display unit 530 are realized by software. The storage unit 540 is provided in the memory 502.

The processor 501 is a device that executes a control program to be executed in the second device 50. The control program to be executed in the second device 50 is a program that realizes the functions of the request acceptance unit 510, the communication unit 520, and the display unit 530.

The processor 501 is an integrated circuit (IC) that performs arithmetic processing. Specific examples of the processor 501 are a CPU, a digital signal processor (DSP), and a graphics processing unit (GPU).

The memory 502 is a storage device to temporarily store data. Specific examples of the memory 502 are a static random access memory (SRAM) and a dynamic random access memory (DRAM).

The auxiliary storage device 503 is a storage device to store data. A specific example of the auxiliary storage device 503 is an HDD. Alternatively, the auxiliary storage device 503 may be a portable storage medium such as an SD (registered trademark) memory card, CF, a NAND flash, a flexible disk, an optical disc, a compact disc, a Blu-ray (registered trademark) disk, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

Specifically, the input/output interface 505 is connected to a display device 506.

The input/output interface 505 is a port to be connected with an input device such as a mouse, a keyboard, or a touch panel, and functions as an input interface. The input/output interface 505 is also a port to which a cable of the display device 506 such as a display is connected, and functions also as an output interface.

Specifically, the input/output interface 505 is a Universal Serial Bus (USB) terminal or a High Definition Multimedia Interface (HDMI, registered trademark) terminal. The input/output interface 505 may be a port to be connected with a local area network (LAN). Specifically, the display device 506 is a liquid crystal display (LCD).

The second device 50 displays a request acceptance screen 71 and a confirmation screen 73 on the display device 506 via the input/output interface 505. The second device 50 acquires a control-operation request 63 and a confirmation result 731 from the user 80 through the request acceptance screen 71 displayed on the display device 506 via the input/output interface 505.

The communication device 504 has a receiver and a transmitter. The communication device 504 is connected to a communication network such as a LAN, the Internet, or a telephone line. Specifically, the communication device 504 is a communication chip or a network interface card (NIC). The second device 50 connects to the wireless LAN 12 via the communication device 504, and transmits a second control request 62 and a confirmation result 731 to the air conditioner 30. The second device 50 connects to the wireless LAN 12 via the communication device 504, and receives a selected control method 65 from the air conditioner 30.

The control program is loaded into the processor 501 and executed by the processor 501. The memory 502 stores not only the control program but also an operating system (OS). The processor 501 executes the control program while executing the OS. The control program and the OS may be stored in the auxiliary storage device 503. The control program and the OS stored in the auxiliary storage device 503 are loaded into the memory 502 and executed by the processor 501. Part or the entirety of the control program may be embedded in the OS.

The second device 50 may include a plurality of processors as an alternative to the processor 501. The plurality of processors share execution of the control program. Each of the processors is, like the processor 501, a device that executes the control program.

Data, information, signal values, and variable values that are used, processed, or output by the control program are stored in the memory 502 or the auxiliary storage device 503, or stored in a register or a cache memory in the processor 501.

"Unit" in each unit of the request acceptance unit 510, the communication unit 520, and the display unit 530 may be interpreted as "process", "procedure", or "step". "Process" in the request acceptance process, the communication process, and the display process may be interpreted as "program", "program product", or "computer readable storage medium recording a program".

The control program causes a computer to execute each process, each procedure, or each step, where "unit" of each of the above units is interpreted as "process", "procedure", or "step". A control method is a method performed by execution of the control program by the second device 50.

The control program may be stored and provided in a computer readable recording medium. The control program may be provided as a program product.

Figure 5:
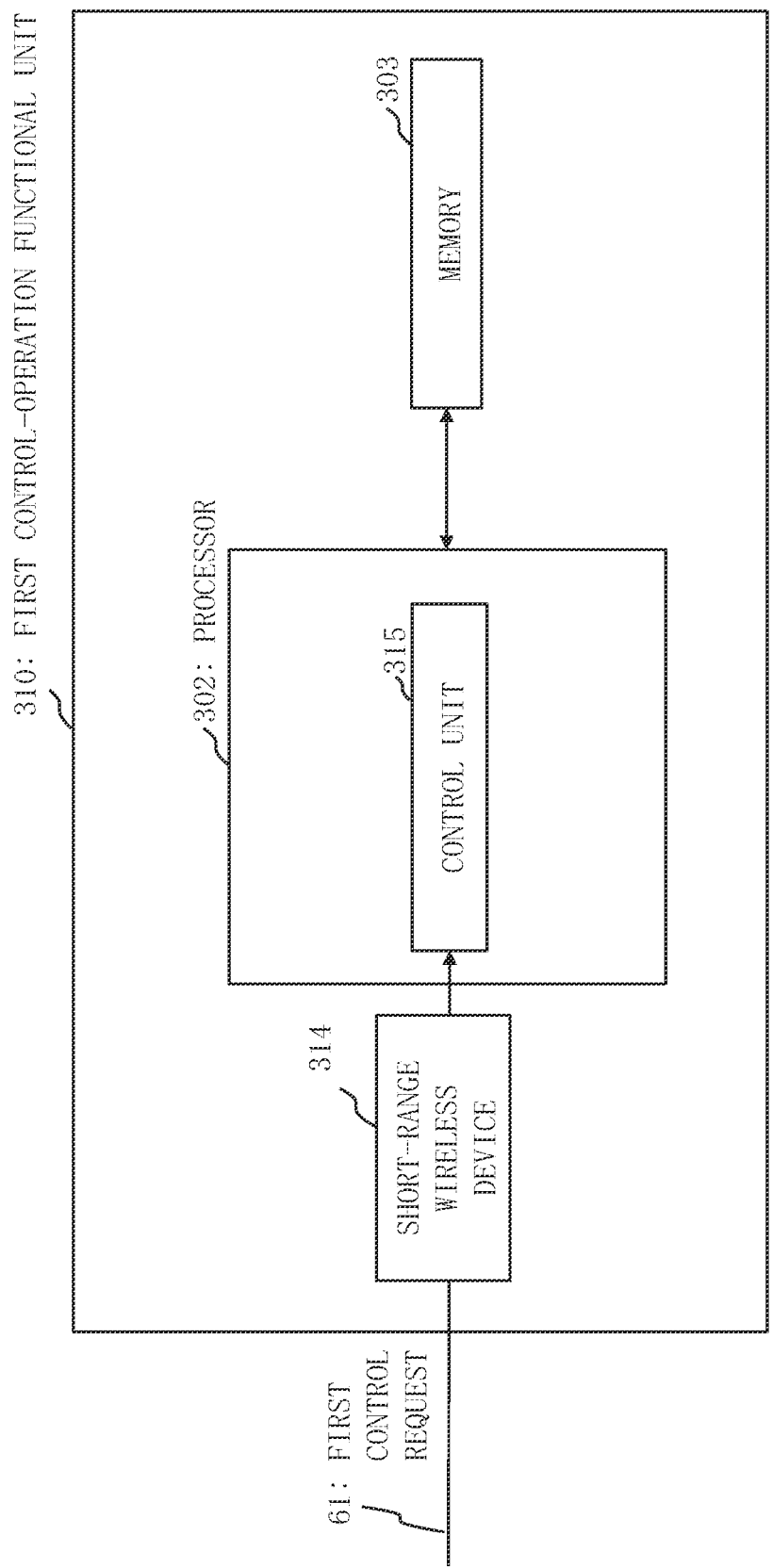
FIG. 5 is a configuration diagram of a first control-operation functional unit according to the first embodiment.

FIG. 5 is a diagram illustrating a configuration of the first control-operation functional unit 310 according to this embodiment.

Figure 6:
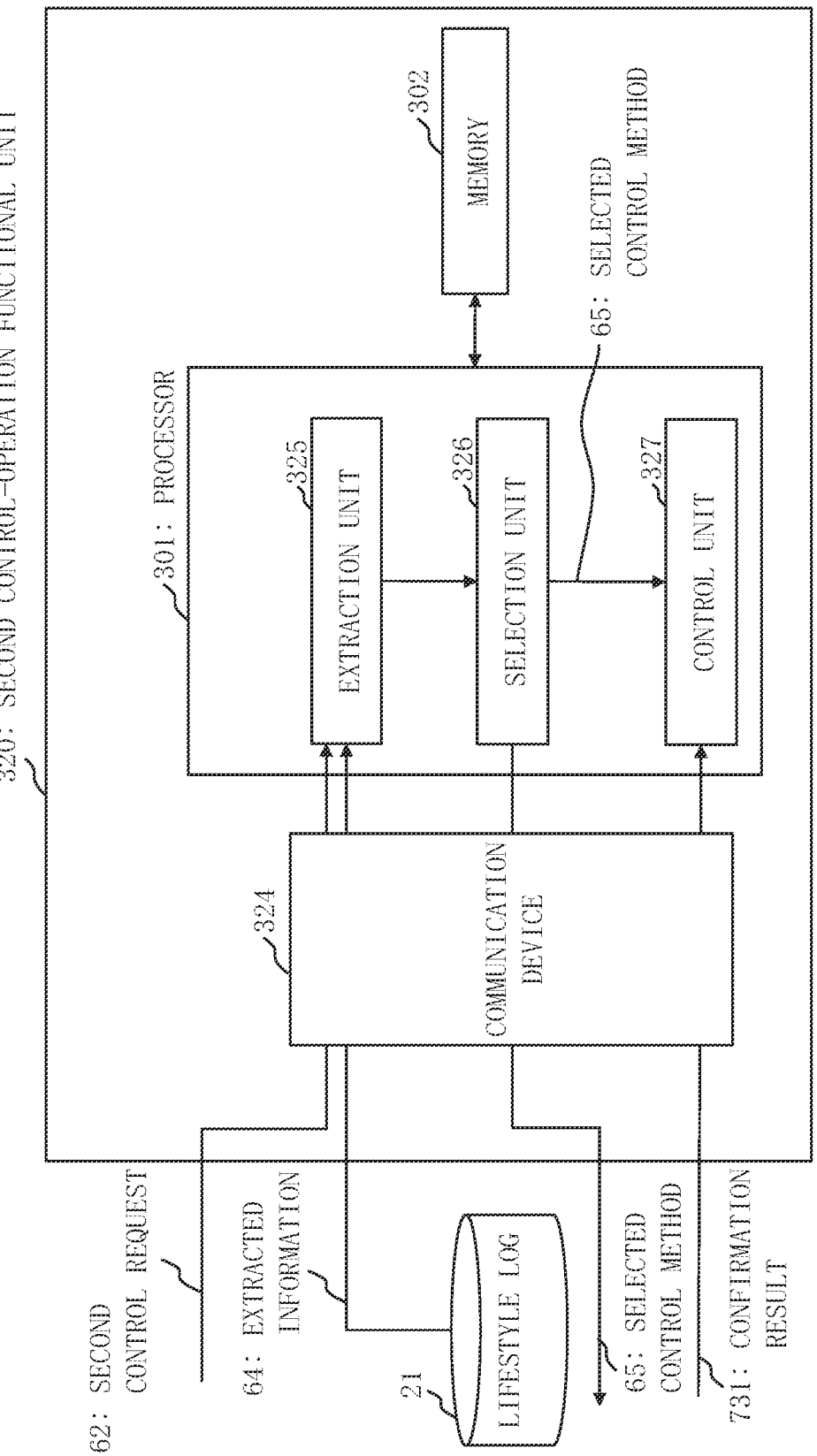
FIG. 6 is a configuration diagram of a second control-operation functional unit according to the first embodiment.

FIG. 6 is a diagram illustrating a configuration of the second control-operation functional unit 320 according to this embodiment.

The first control-operation functional unit 310 and the second control-operation functional unit 320 are provided in one microcomputer 301. Alternatively, each of the first control-operation functional unit 310 and the second control-operation functional unit 320 may be a microcomputer. The microcomputer 301 includes a processor 302 and also includes other hardware components such as a memory 303, a short-range wireless device 314, and a communication device 324. The processor 302 is connected with the other hardware components via signal lines and controls these other hardware components.

In the following, the first control-operation functional unit 310 and the second control-operation functional unit 320 will be described separately. However, as described above, the first control-operation functional unit 310 and the second control-operation functional unit 320 may be one microcomputer 301 or may be separate microcomputers. The microcomputer 301 is a controller that controls the refrigeration cycle equipment of the air conditioner 30.

The first control-operation functional unit 310 includes a control unit 315 as a functional element. The second control-operation functional unit 320 includes an extraction unit 325, a selection unit 326, and a control unit 327 as functional elements. The functions of the functional elements of the first control-operation functional unit 310 and the second control-operation functional unit 320 are realized by software.

In the following, the configuration of the second control-operation functional unit 320 will be described. However, by interpreting the extraction unit 325, the selection unit 326, and the control unit 327 as the control unit 315, the description can similarly apply also to the first control-operation functional unit 310.

Specifically, the functions of the extraction unit 325, the selection unit 326, and the control unit 327 are realized by a control program executed by the second control-operation functional unit 320. The control program is a program that causes a computer to execute processes performed by the extraction unit 325, the selection unit 326, and the control unit 327 as an extraction process, a selection process, and a control process, respectively. The control program may be recorded and provided in a computer readable medium, may be stored and provided in a recording medium, or may be provided as a program product.

The processor 302 is a device that executes the control program. The processor 302 is, for example, a CPU.

The memory 303 is a device to store the control program. The memory 303 is, for example, a RAM, a flash memory, or a combination of these.

The communication device 324 includes a receiver to receive data input to the control program and a transmitter to transmit data output from the control program. The communication device 324 is, for example, a communication chip or a NIC. The second control-operation functional unit 320 receives a second control request 62 and a confirmation result 731 from the second device 50 via the communication device 324. The second control-operation functional unit 320 acquires information in the lifestyle log 21 from the file server 20 of the cloud system via the communication device 324. The second control-operation functional unit 320 transmits a selected control method 65 to the second device 50 via the communication device 324.

The first control-operation functional unit 310 includes the short-range wireless device 314 in place of the communication device 324. The short-range wireless device 314 performs short-range wireless communication such as infrared communication or Bluetooth (registered trademark). The first control-operation functional unit 310 receives a first control request 61 from the first device 40 via the short-range wireless device 314.

The control program is loaded from the memory 303 into the processor 302 and executed by the processor 302. The memory 303 stores not only the control program but also an OS. The processor 302 executes the control program while executing the OS. Part or the entirety of the control program may be embedded in the OS.

The second control-operation functional unit 320 may include a plurality of processors as an alternative to the processor 302. The plurality of processors share execution of the control program. Each of the processors is, for example, a CPU.

Data, information, signal values, and variable values that are used, processed, or output by the control program are stored in the memory 303, or stored in a register or a cache memory in the processor 302.

The first control-operation functional unit 310 and the second control-operation functional unit 320 may be constituted by a plurality of microcomputers.

Description of Operation

Referring to FIGS. 7 to 10, operation of the control system 10 according to this embodiment will be described. The operation of the control system 10 corresponds to the control method according to this embodiment.

First, the attribute information 541 that is stored in advance in the second device 50 such as a PC, a smartphone, or a tablet terminal will be described.

The attribute information 541 is information that indicates attributes of the user 80 who uses the air conditioner 30. Specifically, the attribute information 541 is information that indicates attributes such as the gender, age, and family structure of the user 80. Vital data such as blood pressure, heart rate, and respiration of a human body is also information that indicates attributes. Furthermore, it is desirable that a lifestyle itself be recognized as attributes. As a specific example, if the user 80 is a two-person household consisting of a man in his thirties and a woman in her thirties, it is desirable that whether the household is a double-income household with no children be recognized. Behavior patterns such as when to get up, go out, come home, take a bath, and go to bed may also be recognized as attributes. Preferences such as sensitive to heat or sensitive to cold may also be recognized as attributes. Information on a house where the air conditioner 30 is installed and the like may also be recognized.

As the information on the house, for example, at least one of the installation position of an indoor unit, the type of building where the indoor unit is installed, the orientation of the building, the type of room and size of the room, and the height of a ceiling (including a vaulted ceiling), which is an indoor state of the room, and the like may be set as the attribute information 541. More specifically, the center of the wall, the corner of the wall, or the like is set as the installation position of the indoor unit, and detached house, apartment, top floor in apartment, or the like is set as the type of building where the indoor unit is installed. North-facing, south-facing, west-facing, east-facing, or the like is set as the orientation of the building, and living room, bedroom, private room, kitchen, dining room, or the like is set as the type of room.

In this embodiment, the attribute information 541 is stored in the second device 50 and transmitted from the second device 50 to the air conditioner 30, but it may be registered in the file server 20 in advance. Alternatively, the attribute information 541 may be input to the air conditioner 30 by a third party other than the user 80 such as an installer of the air conditioner 30.

Figure 7:
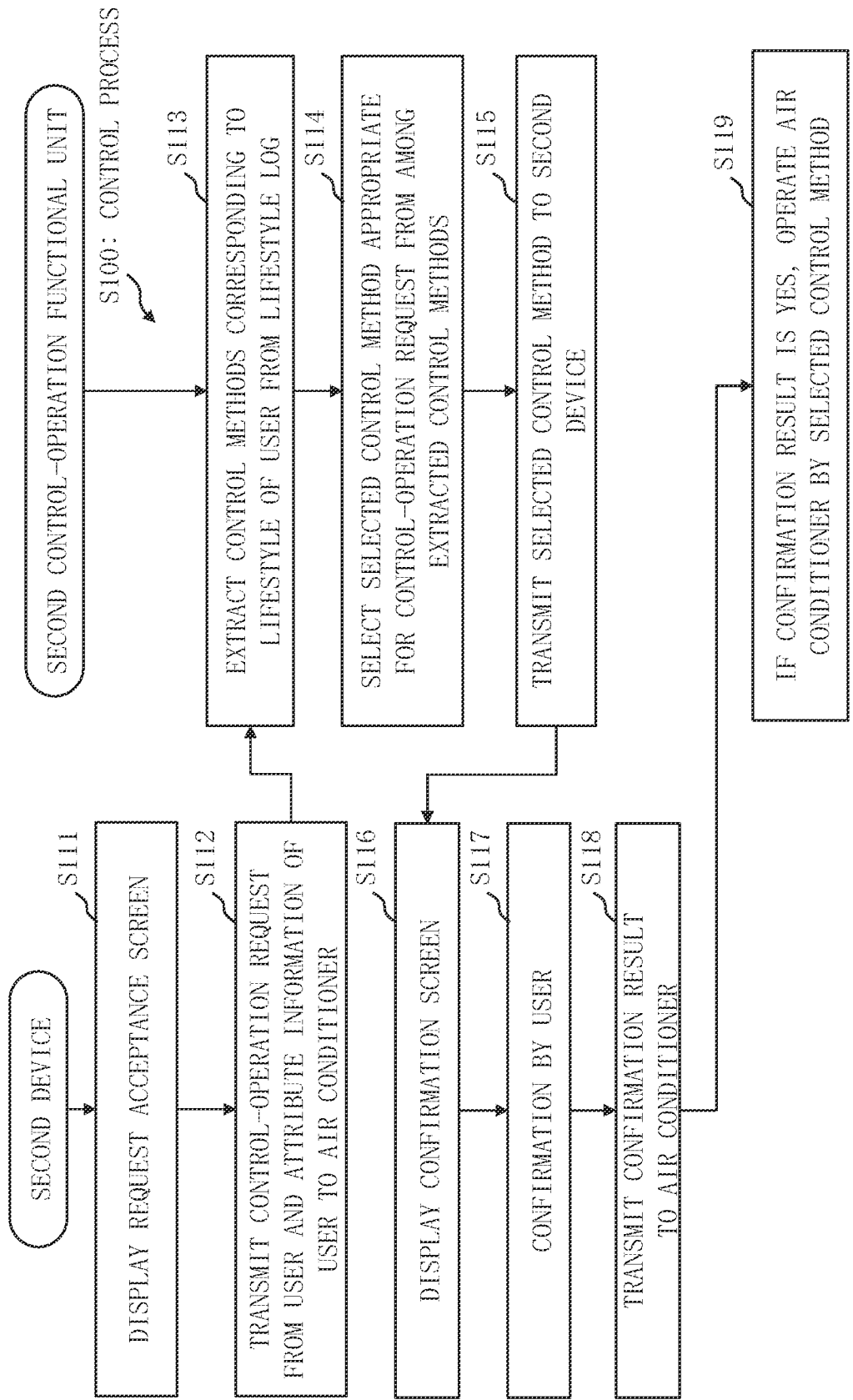
FIG. 7 is a flowchart of a control process of the control system according to the first embodiment.

FIG. 7 is a flowchart of a control process S100 of the control system 10 according to this embodiment.

In step S111, the display unit 530 of the second device 50 displays the request acceptance screen 71 on the display device 506. The request acceptance screen 71 is a screen to accept a control-operation for the air conditioner 30 from the user 80 as the control-operation request 63.

FIG. 8 is a diagram illustrating an example of the request acceptance screen 71 according to this embodiment.

The request acceptance screen 71 can accept operation control that cannot be accepted by the first device 40, which is a commonly used remote controller or the like, that is, sophisticated operation control. Sophisticated operation control means, for example, to perform control by changing factory default control programming or data of the controller (the control units 315, 327).

In the example of the request acceptance screen 71 in FIG. 8, the screen is such that a plurality of conditions can be entered for each of operation type, temperature control, air flow direction control, air volume control, and operation control. For the temperature control, condition 1 is set to 27.5° C. and condition 2 is set to 24.5° C. For the air flow direction control, condition 1 is set to "80-degree angle to the southwest" and condition 2 is set to "80-degree angle to the northeast". For the air volume control, condition 1 is set to "strong air flow". In the operation control, operation details using the conditions described above are set. The display unit 530 accepts the operation details set in the operation control as the control-operation request 63.

After completing entry to the request acceptance screen 71, the user 80 presses a transmit button.

The request acceptance screen 71 in FIG. 8 is an example, and any user interface can be provided, as long as it is a screen that allows complex operation control to be set. A user interface such as a virtual assistant using audio input may also be used.

Although not illustrated in FIG. 8, it may be arranged that complex timer control can be performed. A typical timer function starts or stops operation at a given preset time. The request acceptance screen 71 further allows any date and time in 24 hours and 365 days to be set. Furthermore, the request acceptance screen 71 allows a setting to be made for changing the set temperature at any given time while the timer is operating.

In step S112, when the control-operation request 63 is accepted from the user 80 through the request acceptance screen 71, the communication unit 520 of the second device 50 transmits a second control request 62 including the control-operation request 63 and the attribute information 541 of the user 80 to the second control-operation functional unit 320. Specifically, the communication unit 520 transmits the second control request 62 to the second control-operation functional unit 320 via the wireless LAN 12. The control-operation request 63 includes the details of the operation control. The communication unit 520 may include in the second control request 62 only information recognized as the lifestyle of the user 80 in the attribute information 541.

FIG. 9 is a diagram illustrating an example of the lifestyle log 21 according to this embodiment.

In the lifestyle log 21, information associating lifestyle information 212 indicating a lifestyle with a control method 213 of the air conditioner 30 is accumulated. Specifically, in the lifestyle log 21, each record is associated with a record number 211, lifestyle information 212, and a control method 213.

The lifestyle information 212 includes information that indicates a lifestyle, such as information on the age, family structure, job style, behavior patterns, preferences, or house.

The control method 213 includes information such as operation type, temperature control, air flow direction control, air volume control, timer control, and operation control.

In this embodiment, the control method 213 included in the lifestyle log 21 is assumed to be operation control that cannot be accepted by the first device 40, which is a commonly used remote controller or the like, that is, a more sophisticated operation control method. For example, in the lifestyle log 21, control methods actually used to control the air conditioner 30 when the user 80 who has previously used the air conditioner 30 requested sophisticated operation control are set.

Specifically, sophisticated operation control is to change the rotational speed of the fan of the indoor unit or outdoor unit or change the allowable range of the rotational speed of the compressor, to change speed options for changing the rotational speed of the compressor, or to change air flow direction control of the indoor unit. For example, by sophisticated operation control, it is possible to change the set value of the rotational speed of the fan or the set value of air flow direction that is preset, so as to adjust the force or direction of air flow as preferred by the user. It is also possible to change the minimum rotational speed and maximum rotational speed of the compressor, or speed options in control of the rotational speed of the compressor that are preset, so as to make adjustment depending on the installation environment or as preferred by the user. It is also possible to change the brightness setting of a lamp that displays the operating state, so as to make adjustment as preferred by the user.

In step S113, the extraction unit 325 of the second control-operation functional unit 320 extracts control methods 213 corresponding to lifestyle information 212 indicating the lifestyle of the user 80 from the lifestyle log 21, based on the attribute information 541 of the user 80 included in the second control request 62. The extraction unit 325 may extract all records corresponding to lifestyle information 212 indicating the lifestyle of the user 80 from the lifestyle log 21. Specifically, the extraction unit 325 searches for lifestyle information 212 matching or resembling the information on the age, family structure, behavior pattern, house, or the like of the user 80 included in the attribute information 541. The extraction unit 325 extracts records that include lifestyle information 212 matching or resembling the attribute information 541. It is assumed that predetermined criteria are used as the criteria for determining a match or resemblance. If it is desirable to determine a control method from many samples, a small degree of resemblance in lifestyle is sufficient and thus the criteria for determination are set loosely. If it is desirable to determine a control method from samples with an almost exact match in lifestyle, the criteria for determination are set strictly.

In step S114, the selection unit 326 of the second control-operation functional unit 320 selects a control method 213 appropriate for the control-operation request 63 included in the second control request 62 as a selected control method 65 from among the control methods 213 extracted by the extraction unit 325. Specifically, the selection unit 326 selects a record that most resembles the details of the operation control included in the control-operation request 63 from among the records in the lifestyle log 21 extracted by the extraction unit 325. The selection unit 326 selects a record including a control method 213 that most resembles the control-operation request 63 by comparing information such as the operation type, temperature control, air flow direction control, air volume control, timer control, and operation control with the control-operation request 63. Then, the control method 213 included in that record is treated as the selected control method 65.

In step S115, the selection unit 326 transmits the selected control method 65 that has been selected to the second device 50. Specifically, the selection unit 326 transmits the selected control method 65 to the second device 50 via the wireless LAN 12 such as Wi-Fi (registered trademark).

In step S116, the display unit 530 of the second device 50 displays the confirmation screen 73 on the display device 506. The confirmation screen 73 is a screen for making the user 80 confirm whether the air conditioner 30 can be operated by the selected control method 65.

Figure 10:
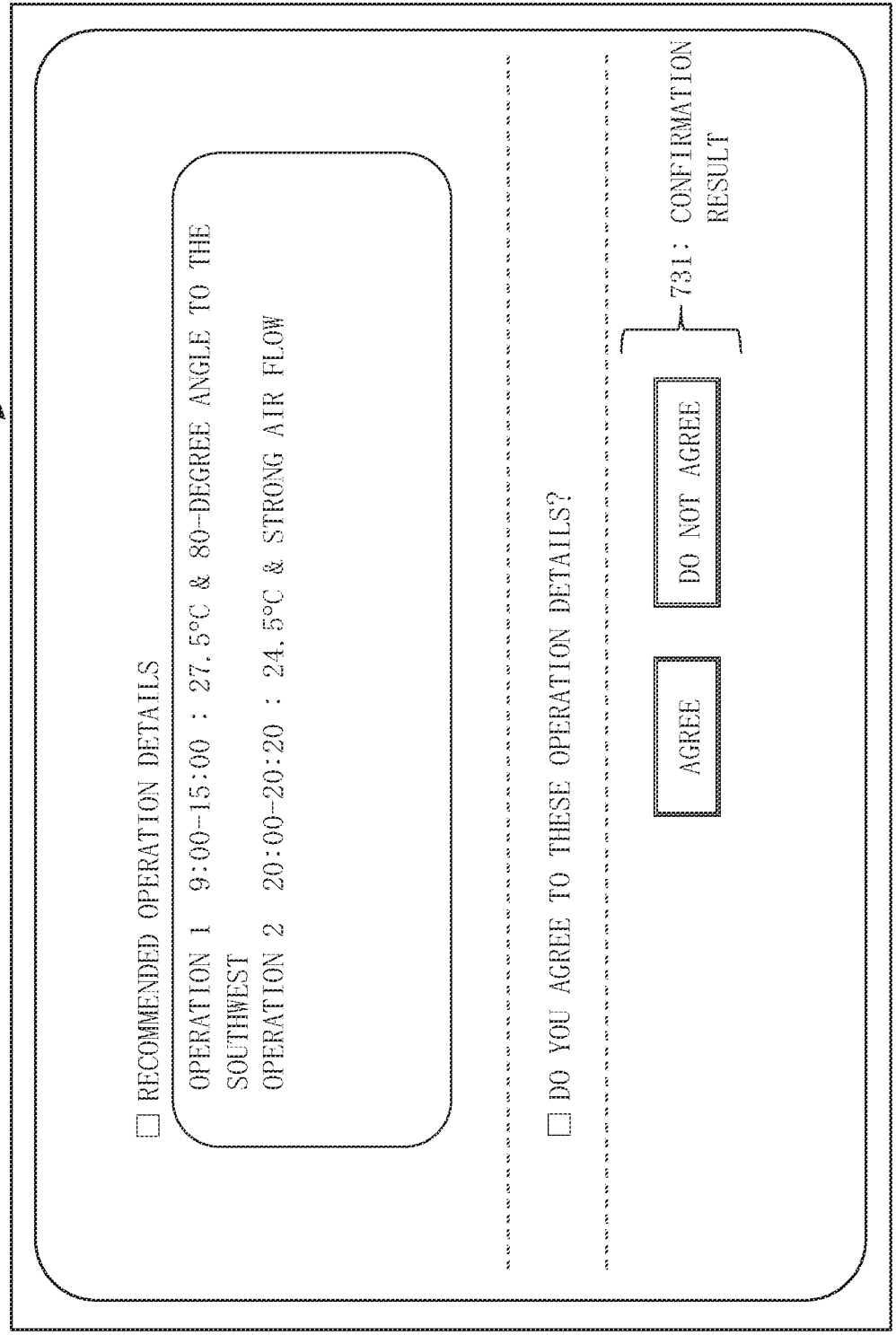
FIG. 10 is a diagram illustrating an example of a confirmation screen according to the first embodiment.

FIG. 10 is a diagram illustrating an example of the confirmation screen 73 according to this embodiment.

In the confirmation screen 73, the details of the selected control method 65 are displayed in a "recommended operation details" section. The confirmation screen 73 is provided with an "agree" button and a "do not agree" button for the question "Do you agree to these operation details?".

In step S117, the display unit 530 acquires a confirmation result 731 from the user 80 through the confirmation screen 73. The display unit 530 acquires the confirmation result 731 as a result of the "agree" button or the "do not agree" button in the confirmation screen 73 being pressed by the user 80.

In step S118, the display unit 530 transmits the confirmation result 731 to the second control-operation functional unit 320 via the wireless LAN 12.

In step S119, if the confirmation result 731 is "agree", that is, "yes", the control unit 327 of the second control-operation functional unit 320 controls the air conditioner 30 using the selected control method 65. Specifically, the control unit 327 executes a process such as rewriting control programming or control data according to the selected control method 65 and realizes more sophisticated operation control.

The control-operation display unit 330 displays whether the air conditioner 30 is operated by the first device 40 or operated by the second device 50. Specifically, the control-operation display unit 330 may distinguish between being operated by the first device 40 and being operated by the second device 50, based on the lighting mode of a light emitting diode (LED) such as turned on, turned off, and flashing, the color of the LED, or the like. Alternatively, the control-operation display unit 330 may include a display, and whether being operated by the first device 40 or being operated by the second device 50 may be displayed on the display.

Other Configurations

<First Variation>

This embodiment has been described using the air conditioner 30 as an example of refrigeration cycle equipment. However, in addition to the air conditioner, this embodiment can also be applied to refrigeration cycle equipment such as floor heating or a water heater as long as the equipment uses a refrigeration cycle. This embodiment can also be applied to what is known as a multi-split air conditioner in which a plurality of indoor units are provided for one outdoor unit or which is installed together with floor heating.

<Second Variation>

In this embodiment, after the selected control method 65 is selected in the second control-operation functional unit 320, the confirmation screen 73 is displayed in the second device 50. Then, after obtaining agreement from the user 80 through the confirmation screen 73, the second control-operation functional unit 320 controls the air conditioner 30 using the selected control method 65. However, after selecting the selected control method 65, the second control-operation functional unit 320 may immediately perform control using the selected control method 65 without confirming with the user 80. This can prevent the user 80 from being asked to operate the second device 50 many times and improves the convenience of the user.

<Third Variation>

The functions of the request acceptance unit 510, the communication unit 520, and the display unit 530 in the second device 50 will be referred to as the functions of the second device 50.

In this embodiment, the functions of the second device 50 are realized by software. However, as a variation, the functions of the second device 50 may be realized by dedicated hardware. Alternatively, the functions of the second device 50 may be realized by a combination of software and the dedicated hardware. That is, some of the functions of the second device 50 may be realized by the dedicated hardware, and the rest may be realized by software.

The dedicated hardware is, for example, a single circuit, a composite circuit, a programmed processor, a parallel-programmed processor, a logic IC, a GA, an FPGA, an ASIC, or a combination of some or all of these. "IC" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

Each of the processor and the dedicated hardware is processing circuitry. That is, regardless of whether the functions of the second device 50 are realized by software or a combination of software and hardware, the operation of the second device 50 is performed by the processing circuitry.

The functions of the control unit 315 in the first control-operation functional unit 310 and the extraction unit 325, the selection unit 326, and the control unit 327 in the second control-operation functional unit 320 will be referred to as the functions of the first control-operation functional unit 310 and the second control-operation functional unit 320.

In this embodiment, the functions of the first control-operation functional unit 310 and the second control-operation functional unit 320 are realized by software. However, as a variation, the functions of the first control-operation functional unit 310 and the second control-operation functional unit 320 may be realized by dedicated hardware. Alternatively, the functions of the first control-operation functional unit 310 and the second control-operation functional unit 320 may be realized by a combination of software and the dedicated hardware. That is, some of the functions of the first control-operation functional unit 310 and the second control-operation functional unit 320 may be realized by the dedicated hardware, and the rest may be realized by software.

The dedicated hardware is, for example, a single circuit, a composite circuit, a programmed processor, a parallel-programmed processor, a logic IC, a GA, an FPGA, an ASIC, or a combination of some or all of these.

Each of the processor and the dedicated hardware is processing circuitry. That is, regardless of whether the functions of the first control-operation functional unit 310 and the second control-operation functional unit 320 are realized by software, realized by hardware, or realized by a combination of software and hardware, the operation of the first control-operation functional unit 310 and the second control-operation functional unit 320 is performed by the processing circuitry.

Description of Effects of this Embodiment

According to this embodiment, even if the user does not know how to utilize advanced functions of the air conditioner, the user interface of the request acceptance screen allows the user to request operation control outside the range of operation control that can be operated with a remote controller. Therefore, capabilities of the air conditioner that allow various types of operation can be made more easily accessible to the user, so that usability can be improved. In addition, sophisticated operation control can be realized, so that the requirements of the user can be met more precisely.

According to this embodiment, the lifestyle log based on past records is used, so that even if the user requests an inappropriate way of using the functionality of the air conditioner, a control method that effectively utilizes the air conditioner can be suggested. In this embodiment, the confirmation screen that askes for confirmation from the user is displayed and agreement from the user is obtained, so that even if an appropriate control method different from the request from the user is suggested, the user can use that control method with satisfaction.

According to this embodiment, default control programming or data of the controller (the control unit of the microcomputer) of the refrigeration cycle equipment of the air conditioner can be changed. Therefore, the convenience of the user can be improved, comfort can be improved, and energy saving can be improved.

In this embodiment, the control-operation display unit displays whether control is being performed by the first control-operation functional unit or the second control-operation functional unit. In the refrigeration cycle equipment having the first device and the second device, operation that cannot be controlled by the first device can be controlled by the second device. Thus, if the user forgets which of the devices is used for control-operation, the user becomes anxious not knowing what type of operation is currently being performed. For example, the user may erroneously assume that the equipment has failed, which may result in an increase in the number of enquiries to the manufacturer of the equipment. In this this embodiment, the air conditioner has the control-operation display unit, so that the operation currently being performed is operated by the first device or the second device can be displayed. Therefore, the anxiety of the user can be relieved. In addition, an effect of leading to improvement in operability can be obtained.

As a major technology for energy saving in the refrigeration cycle equipment, a direct current brushless motor (DC motor) is adopted as the motor of the compressor. This achieves energy saving in the refrigeration cycle equipment. In addition, maximum capacity, for example, maximum heating capacity and maximum cooling capacity are significantly improved, and a variable range of operation capacity is significantly extended. Therefore, this embodiment has an effect of further enhancing the effects of the convenience of the user, comfort, and energy saving obtained by providing the second device and the second control-operation functional unit that acquires a control request from the second device.

In this embodiment, each heat exchanger has a fan and a fan motor and uses at least one DC motor. As another major technology for energy saving in the refrigeration cycle equipment, the DC motor is adopted as the fan motor of the fan of each heat exchanger. This achieves not only energy saving in the refrigeration cycle equipment but also an increase in the maximum rotational speed of the fan, and also allows the minimum rotational speed to be lowered, so that a variable range of air volume is dramatically improved. This significantly extends the capacity of the refrigeration cycle equipment, for example, variable ranges of maximum heating capacity, maximum cooling capacity, minimum heating capacity, minimum cooling capacity, and the like. Furthermore, the range of noise associated with changes in air volume is extended, allowing silent operation and high-performance operation. Therefore, according to this embodiment, by providing the second device and the second control-operation functional unit that acquires a control request from the second device, the convenience of the user, comfort, and energy saving can be further enhanced.

The impact of installing refrigeration cycle equipment will be described using a wall-mounted air conditioner, which is currently the mainstream in household use, as an example. For example, as indicated in JISC9612, the type of house and orientation of the house greatly affect the air conditioning capacity (air conditioning load) required for the building.

As for the ceiling height, 2.6 m is standard for Japanese houses. In recent years, if the installation environment has a high ceiling of 2.8 m, for example, the air conditioning load increases by as much as about 8% simply in direct proportion to the ceiling height.

In the case of heating operation, if the indoor unit of the air conditioner is installed at a high place, hot air does not reach sufficiently and the temperature around feet becomes lower, causing discomfort, and the sensory temperature, which is a feeling that the temperature around feet is hot or cold, becomes lower. In this case, the user increases the set temperature of operation. As a result, energy saving greatly deteriorates.

During heating operation and cooling operation, coming into contact with air flow makes people uncomfortable. In the case of cooling operation, coming into direct contact with air flow may cause the sensory temperature to decrease, resulting in deterioration in the physical condition of the user, such as catching a cold.

Therefore, detailed air flow control in accordance with the preference of the user is required.

A specific example of air flow control will be described.

For example, in equipment in which air flow control of an indoor unit allows the air flow to be adjusted to the left and the right, if the indoor unit is installed at the left corner of the wall, it is not necessary to control the air flow to the left because that will cause the air flow to be directed to the wall. In this case, by making adjustment such that the air flow is finely controlled from the front side of the indoor unit mainly to the right side, air flow control satisfying the preference of the user can be realized and comfort is enhanced.

Next, appropriate control of the rotational speed of the compressor will be described.

The relationship between the rotational speed of the compressor of the air conditioner (air conditioning capacity) and energy efficiency is that the energy efficiency is highest around the mean rotational speed (around rated capacity). Another characteristic is that the closer to the maximum rotational speed (when operating at maximum capacity) or minimum rotational speed (when operating at minimum capacity), the lower the efficiency.

For this reason, for example, in the case of operation in a room with a small air conditioning load, operation at approximately the maximum rotational speed is not needed, and energy saving increases by operation with high energy efficiency.

Conversely, in the case of operation in a room with a large air conditioning load, operation approximately at the minimum rotational speed is not needed, and energy saving increases by operation at a rotational speed with high energy efficiency.

As described above, appropriate control of the rotational speed varies with the type of house and the installation environment. Therefore, by inputting information on the type of house and the installation environment to the air conditioner, operation with higher energy saving is possible.

In refrigeration cycle equipment (when an air conditioner is considered as an example), in general, if cooling capacity and heating capacity need to be increased, the greater the air volume of heat exchangers of an indoor unit and an outdoor unit, the higher the effect. In addition, the higher the rotational speed of a compressor, the higher the cooling capacity and heating capacity that are achieved. As for noise, the greater the air volume, the greater the noise. The higher the rotational speed of the compressor, the greater the noise of the compressor. As a result, noise of the outdoor unit that houses the compressor increases, and also in the indoor unit, the refrigerant sound of a circulating refrigerant increases, resulting in increased noise.

As some users are sensitive to heat and some users are sensitive to cold, preferred heating capacity and cooling capacity vary with each user. Depending on the room of use, quiet operation rather than high performance may be preferred in a bedroom, and high-performance operation may be preferred in a living room, for example. Some users prefer direct contact with air flow from the air conditioner, and some users feel uncomfortable with direct contact with air flow.

As described above, feelings and preferences of users are varied. Thus, by inputting information on the preferences to the air conditioner, it is possible to adjust the capacity, air flow feel, and noise level of the air conditioner to suit the preferences of the user.

As a result, the satisfaction of the user, comfort, and energy saving can be enhanced.

In the first device, a liquid crystal display is prevalently used as a display in general, but a full-dot liquid crystal display is used in some models. However, visibility is much lower in comparison with a display unit of a smartphone or a table computer, which is used as the second device. Also, due to the degree of flexibility of display, only simple limited display can be displayed. The first device can perform only limited control-operations due to a limited number of buttons of the control-operation unit for input.

For this reason, in the case of timer control-operation, although users have various preferences, only simple control-operations such as to stop operation after two hours and to start operation after five hours can be supported. Some models allow operation to be started and stopped at any given time in 24 hours, but this involves complex control-operations and operability deteriorates.

According to this embodiment, since the second device is used, a control-operation to start and stop of operation at any given time according to the preference of the user can be easily performed. Furthermore, by utilizing the operability of the second device, it is possible not only to perform a control-operation to simply start or stop operation, but also to change the set temperature at any time while the timer is operating, without deteriorating the operability. Therefore, for example, during cooling operation, by changing the set temperature to a higher temperature one hour after the timer is started during sleep, operation to prevent the user from getting cold during sleep can be easily supported. During heating operation, it is also possible to easily support performing operation at the set temperature that is lowered 30 minutes after the timer is started during sleep and performing operation at the set temperature that is raised again at wakeup time. As described above, if the timer can be operated optimally to suit the preference of the user, it is possible not only to enhance comfort but also enhance energy saving.

Among air conditioners in refrigeration cycle equipment, there is a type of air conditioner in which a plurality of indoor units are installed for one outdoor unit, and this is called a multi-split air conditioner.

As an environment in which an air conditioner of this type is used, it is widely known that a multi-split air conditioner with a single outdoor unit is used when an air conditioner is installed in each room in a house and there is not a space to install a plurality of outdoor units in a garden or balcony where outdoor units are to be installed.

That is, a user who uses a multi-split air conditioner uses indoor units in various rooms such as a living room, a kitchen, a private room, and a bedroom. As for the environments of rooms in which the indoor units are installed, the indoor units are often installed in rooms facing various direction such as south-facing, north-facing, east-facing, and west-facing.

The types of rooms in which the indoor units of the multi-split air conditioner are installed are not known at a design stage, so that the settings for air volume, air flow direction, and capacity that are suitable for the installation environment described above are not set. When selecting an indoor unit for the multi-split air conditioner, the degree of freedom in selecting an indoor unit is limited compared with types of commonly used air conditioners that are produced in the largest quantities (air conditioners of a type in which one indoor unit is provided for one outdoor unit).

As described above, since the environment in which an indoor unit of the multi-split air conditioner is installed varies greatly depending on the room in which the indoor unit is installed, there arise many cases in which the settings for air volume, air flow direction, and capacity that are suitable for the preferences of the user are not set. For this reason, when it is possible to set the installation environment conditions and the user's preferred air volume, air flow direction, and capacity for each indoor unit individually with the second device, the satisfaction of the user and also comfort are enhanced. In addition, by distributing the limited capacity of the multi-split air conditioner to appropriate capacity for each room, wasteful consumption of the capacity is eliminated and energy saving is achieved.

Second Embodiment

In this embodiment, differences from the first embodiment will be mainly described. Components that are substantially the same as those in the first embodiment are denoted by the same reference signs, and description thereof may be omitted.

In the first embodiment, the selection unit 326 of the second control-operation functional unit 320 selects one selected control method 65, and after confirmation from the user 80 is obtained in the second device 50, the air conditioner 30 is controlled using the selected control method 65. An aspect to be described in this embodiment is that the selection unit 326 selects a plurality of selected control methods 65 and makes the user 80 select one of the plurality of selected control methods 65.

Description of Configuration

Figure 11:
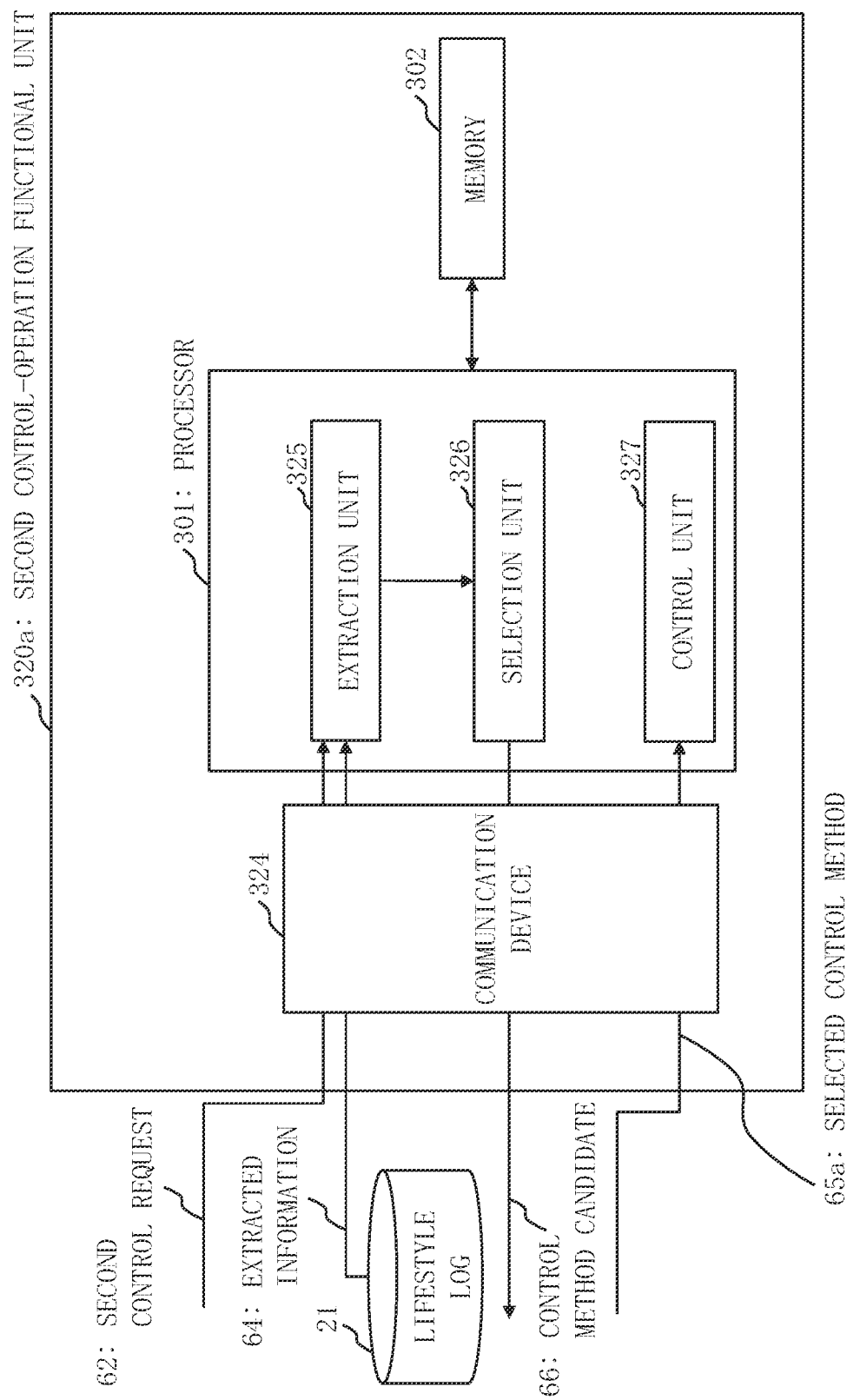
FIG. 11 is a configuration diagram of a second control-operation functional unit according to a second embodiment.

FIG. 11 is a diagram illustrating a configuration of a second control-operation functional unit 320a according to this embodiment.

Figure 12:
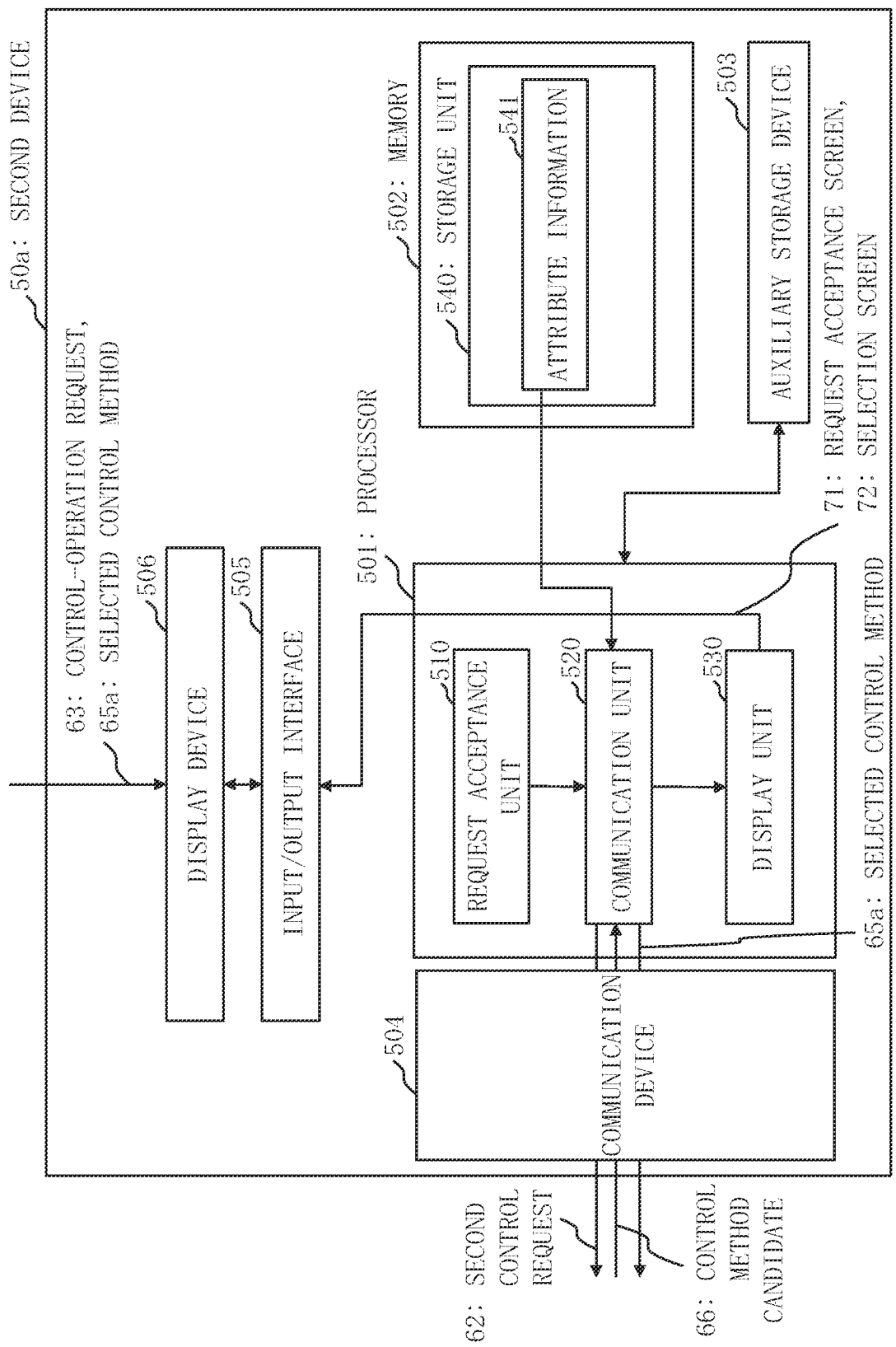
FIG. 12 is a configuration diagram of a second device according to the second embodiment.

FIG. 12 is a diagram illustrating a configuration of a second device 50a according to this embodiment.

In FIG. 11, differences from the second control-operation functional unit 320 of FIG. 6 are that the selection unit 326 transmits a control method candidate 66 to the second device 50a, and that the control unit 327 receives one selected control method 65a from the second device 50a.

In FIG. 12, differences from the second device 50 of FIG. 4 are that the communication unit 520 receives a control method candidate 66 from the second device 50a, that the display unit 530 displays a selection screen 72 on the display device 506 and accepts a selected control method 65a, which is a selection result, and that the communication unit 520 transmits the selected control method 65a to the second device 50a.

Description of Operation

Figure 13:
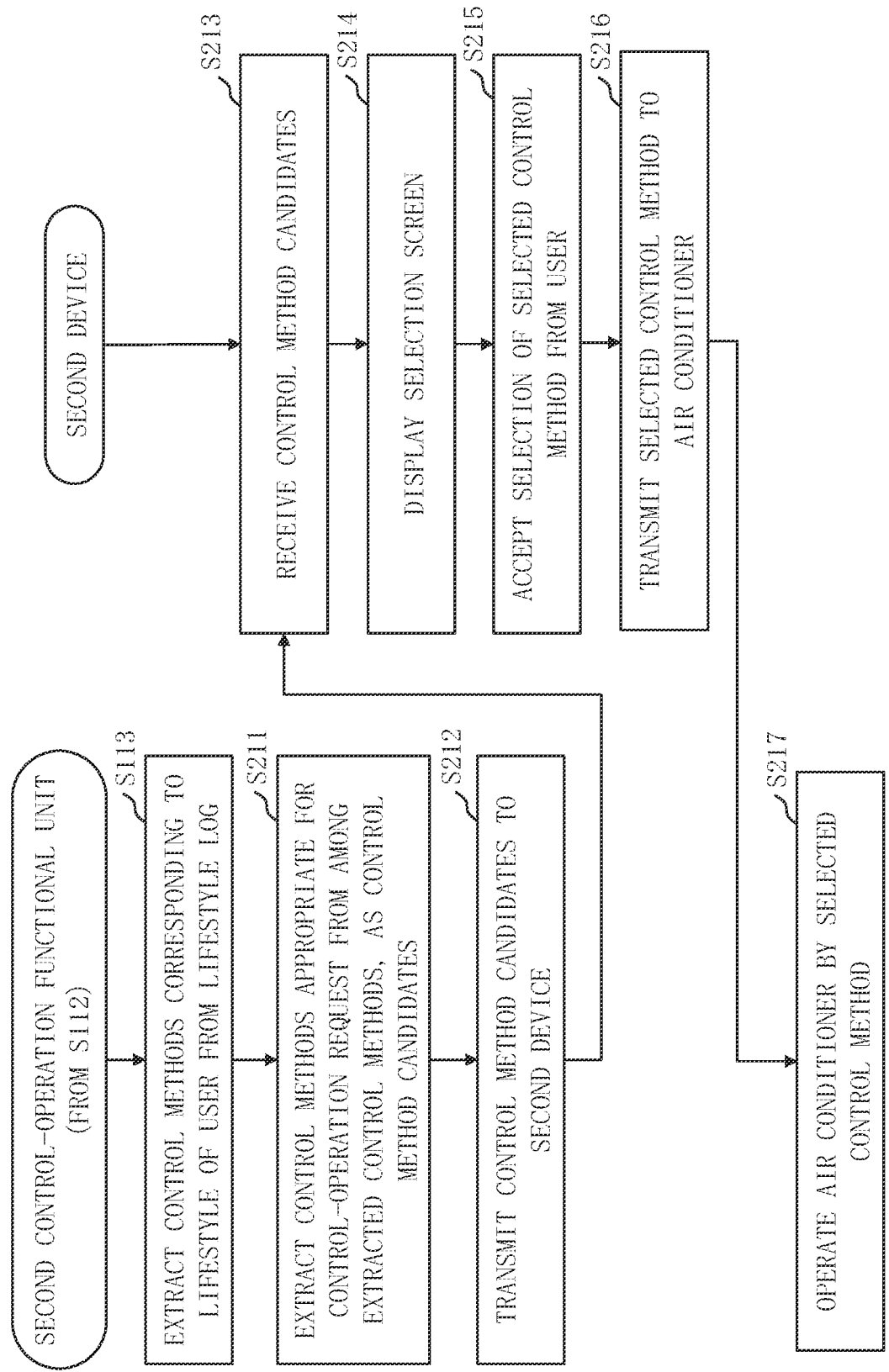
FIG. 13 is a flowchart of a control process of a control system according to the second embodiment.

Referring to FIGS. 13 and 14, operation of the control system 10 will be described.

FIG. 13 is a flowchart of the control process S100 of the control system 10 according to this embodiment.

FIG. 13 is a flowchart indicating that processes of steps S114 to S119 in the flowchart of FIG. 7 are replaced with processes of steps S211 to S218. In FIG. 13, steps S111 and S112 of FIG. 7 are omitted.

In step S113, the extraction unit 325 of the second control-operation functional unit 320 extracts control methods 213 corresponding to lifestyle information 212 representing the lifestyle of the user 80 from the lifestyle log 21, based on attribute information 541 of the user 80 included in a second control request 62. Step S113 is substantially the same as the process described in FIG. 7.

In step S211, the selection unit 326 of the second control-operation functional unit 320 extracts, as control method candidates, control methods appropriate for the operation request included in the second control request from among the control methods extracted by the extraction unit. Specifically, the selection unit 326 searches for lifestyle information 212 matching or resembling the age, family structure, behavior pattern, and the like of the user 80 included in the attribute information 541. The extraction unit 325 extracts records that include lifestyle information 212 matching or resembling the attribute information 541. It is assumed that predetermined criteria are used as the criteria for determining a match or resemblance. If it is desirable to determine a control method from many samples, a small degree of resemblance in lifestyle is sufficient and thus the criteria for determination are set loosely. If it is desirable to determine a control method from samples with an almost exact match in lifestyle, the criteria for determination are set strictly.

In step S212, the selection unit 326 transmits the extracted control method candidates 66 to the second device 50.

In step S213, the communication unit 520 of the second device 50a receives the control method candidates 66 from the second control-operation functional unit 320.

In step S214, the display unit 530 of the second device 50a displays the selection screen 72 on the display device 506. The selection screen 72 is a screen for making the user 80 select a control method from among the control method candidates 66.

FIG. 14 is a diagram illustrating an example of the selection screen 72 according to this embodiment.

The selection screen displays a list of control method candidates 66. The user 80 selects a desired control method, places a checkmark in a corresponding checkbox, and presses a confirm button. In this way, one control method is selected by the user 80 as the selected control method 65a.

In step S215, the display unit 530 accepts, as the selected control method 65a, the control method selected by the user 80 through the selection screen 72.

In step S216, the communication unit 520 of the second device 50a transmits the selected control method 65a to the second control-operation functional unit 320.

In step S217, the control unit 327 of the second control-operation functional unit 320 controls the air conditioner 30 using the selected control method 65a received from the second device 50a. Control by the control unit 327 is substantially the same as described in the first embodiment.

Description of Effects of this Embodiment

According to the control system of this embodiment, it is possible to make the user select one of a plurality of control methods. Therefore, operation control more finely tailored for the user 80 can be realized.

Third Embodiment

In this embodiment, differences from and additions to the first and second embodiments will be mainly described. Components that are substantially the same as those in the first and second embodiments are denoted by the same reference signs, and description thereof may be omitted.

In the first and second embodiments, the control system 10 that controls refrigeration cycle equipment such as a refrigerator, a water heater, and floor heating has been described using the air conditioner 30 as an example. In this embodiment, an example of a control system 10b that controls electrical equipment 90 in place of the refrigeration cycle equipment will be described. In addition to refrigeration cycle equipment such as the air conditioner 30 described in the first and second embodiments, the electrical equipment 90 also includes equipment other than refrigeration cycle equipment.

Description of Configuration

Figure 15:
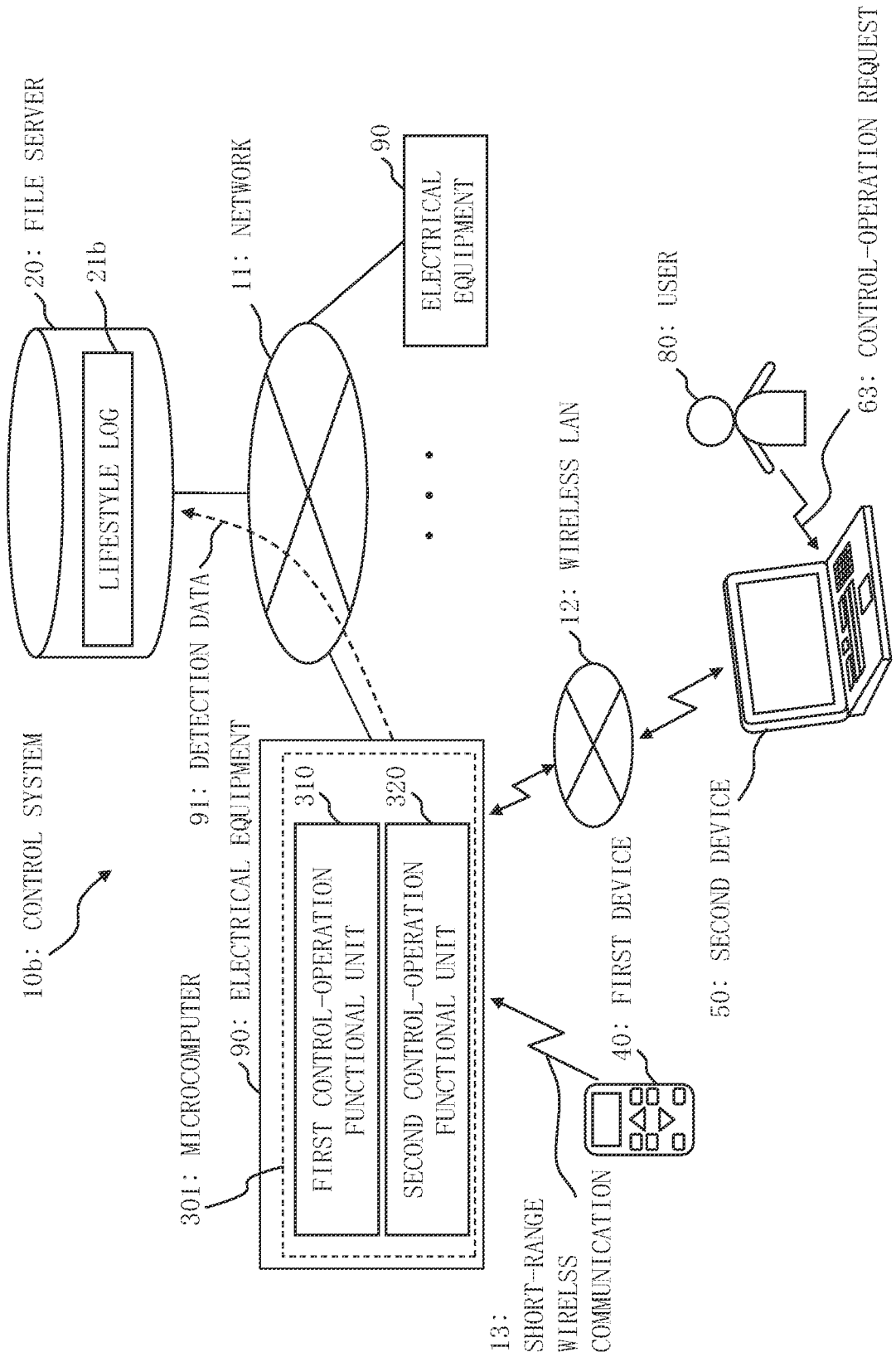
FIG. 15 is a configuration diagram of a control system according to a third embodiment.

FIG. 15 is a diagram illustrating a configuration of the control system 10b according to this embodiment.

The control system 10b has the electrical equipment 30 in place of the air conditioner 30. The electrical equipment 90 may be any electrical equipment that can communicate with the file server 20 via the network 11. For example, the electrical equipment 90 includes home appliances such as a television, lighting equipment, an induction heating (IH) cooker, a microwave oven, a water heater, and a ventilation fan. The electrical equipment 90 also includes communication devices such as a personal computer, a smartphone, a smart speaker, a game machine, and a digital camera. In addition, the electrical equipment 90 also includes electrical facilities such as an elevator and an automatic door.

The electrical equipment 90 transmits detection data 91 to be used for detecting a lifestyle of a user of the electrical equipment 90 to the file server 20. The file server 20 updates a lifestyle log 21b using the detection data 91. In the lifestyle log 21b, information associating lifestyle information 212 indicating a lifestyle with a control method 213b of the electrical equipment 90 is accumulated. The lifestyle log 21b will be described later.

Description of Operation

Figure 16:
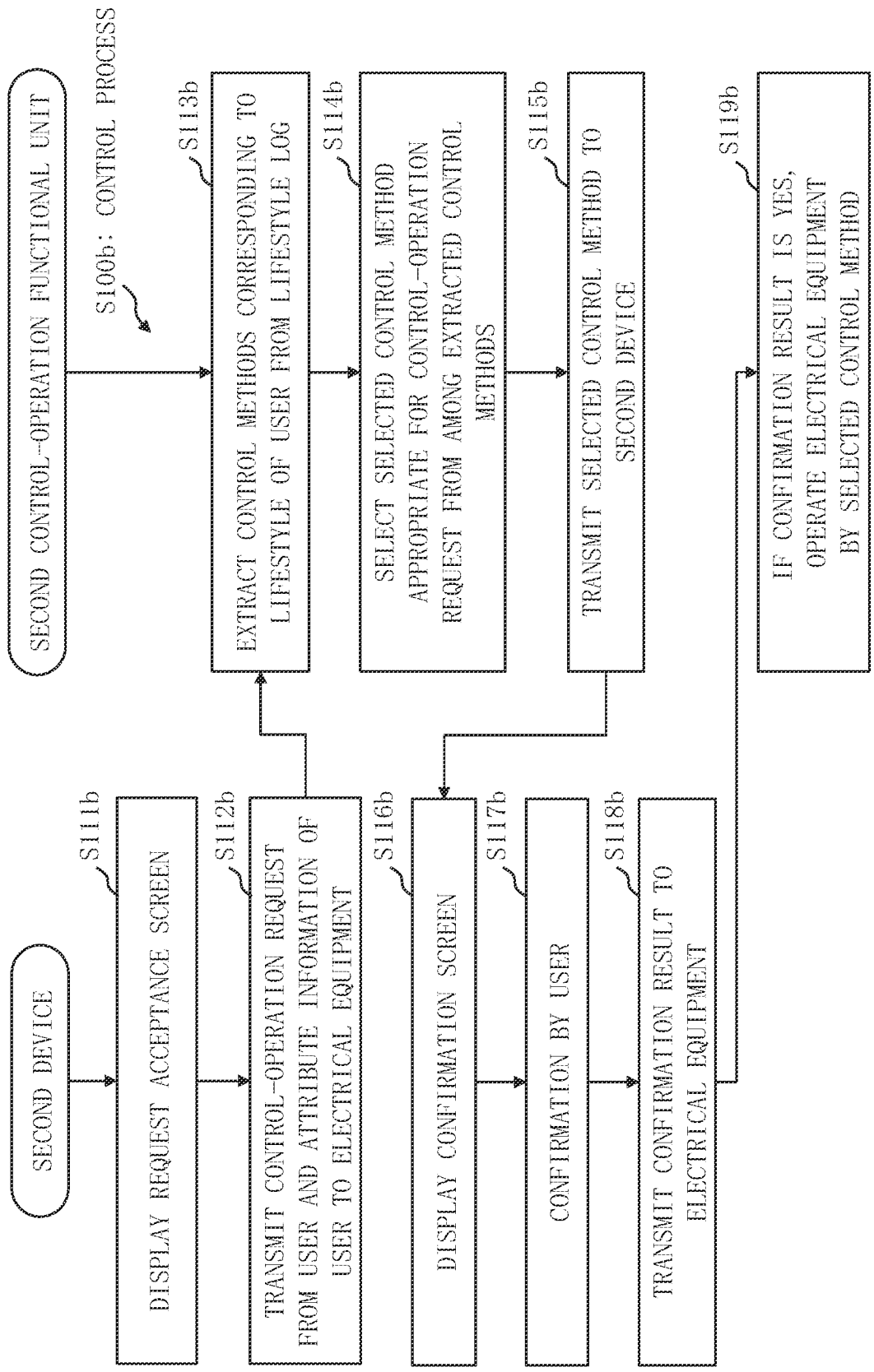
FIG. 16 is a flowchart of a control process of the control system according to the third embodiment.

FIG. 16 is a flowchart of a control process S100b of the control system 10b according to this embodiment. FIG. 16 corresponds to FIG. 7 described in the first embodiment.

Steps S111b to S119b are substantially the same as steps S111 to S119 of FIG. 7 in the first embodiment, where the air conditioner 30 is replaced with the electrical equipment 90.

In the request acceptance screen 71, the lifestyle log 21b, and the confirmation screen 73 used in the control process S100b details appropriate for the electrical equipment 90 are set.

For example, in step S111b, the request acceptance screen 71 displayed by the display unit 530 of the second device 50 is a screen for accepting a control-operation for the electrical equipment 90 from the user 80 as a control-operation request 63. In this embodiment, the request acceptance screen 71 appropriate for the electrical equipment 90 is displayed. For example, if the electrical equipment 90 is a television, control-operations for the television such as the time to turn on the power, the time to turn off the power, programs, volume, and programs to be scheduled for recording are accepted. For example, if the electrical equipment 90 is lighting equipment, control-operations for the lighting equipment such as the time to turn on the power, the time to turn off the power, brightness, and color temperature are accepted. For example, if the electrical equipment 90 is a water heater, control-operations for the water heater such as supply water temperature, bath temperature, and the time to run hot water are accepted.

Similarly, also in the case of the confirmation screen, the screen appropriate for the electrical equipment 90 is displayed.

FIG. 17 is a diagram illustrating an example of the lifestyle log 21b according to this embodiment.

In the lifestyle log 21b according to this embodiment, a control method 213b corresponding to lifestyle information 212 is set. In the control method 213b, a control method for each type of the electrical equipment 90 is set.

For example, if the electrical equipment 90 is a television, a control method for the television, such as the time to turn on the power, the time to turn off the power, programs to watch, sound volumes according to time, and programs to be scheduled for recording, is set depending on the lifestyle information 212. For example, if the electrical equipment 90 is lighting equipment, a control method for the lighting equipment, such as the time to turn on the power, the time to turn off the power, brightness levels according to time, and color temperatures according to time, is set depending on the lifestyle information 212. For example, if the electrical equipment 90 is a water heater, a control method for the water heater, such as supply water temperatures according to time, bath temperatures according to time, and the time to run hot water, is set depending on the lifestyle information 212.

For example, the electrical equipment 90 transmits usage time such as the power on or off time or detection information detected by a detection device such as a sensor or camera to the file server 20, as detection data 91. The file server 20 collects the detection data 91 such as usage time or detection information received from the electrical equipment 90, and updates the lifestyle information 212 of the user 80. Using the detection data 91, the file server 20 updates the lifestyle information 212 and updates the control method 213b of the electrical equipment 90.

For example, based on the usage time of the television and the lighting equipment, a motion detector in the air conditioner, and the like, it is possible to detect a lifestyle as to how many people are watching the television at what time in the user's family. Then, based on information on control-operations in that case such as the television program, sound volume, brightness level of the lighting equipment, and color temperature, control methods of the television and the lighting equipment appropriate for the lifestyle can be calculated. For example, based on information on the usage time of a microwave oven or an IH cooker and information on the supply water temperature of a water heater, a lifestyle as to when cooking is done in the user's family and the number of times hot water is used in that case can be detected. Then, based on the usage time of the microwave oven or the IH cooker, the supply water temperature, and the like in that case, a control method for the water heater appropriate for the lifestyle can be calculated.

Description of Effects According to this Embodiment

In the control system according to this embodiment, it is possible to connect a plurality of types of electrical equipment to the file server and collect data from the electrical equipment. In the control system according to this embodiment, the lifestyle of the user and the control method of the electrical equipment corresponding to the lifestyle can be updated using the detection data. Therefore, in the control system according to this embodiment, a control method of the electrical equipment corresponding to the lifestyle of the user can be selected more appropriately.

In the first to third embodiments above, each unit of each device of the control system has been described as an independent functional block. However, the configuration of each device of the control system may be different from the configurations in the embodiments described above. The functional blocks of each device of the control system may be arranged in any configuration, provided that the functions described in the above embodiments can be realized. Each device of the control system may be a system constituted by a plurality of devices, instead of being a single device.

A plurality of portions of the first to third embodiments may be implemented in combination. Alternatively, one portion of these embodiments may be implemented partially. These embodiments may be implemented in any other combination as a whole or partially.

That is, in the first to third embodiments, the embodiments can be combined freely, or any components of each embodiment can be modified, or any component can be omitted in each embodiment.

The embodiments described above are essentially preferable examples, and are not intended to limit the scope of the present invention, the scope of applications of the present invention, and the scope of intended uses of the present invention. The embodiments described above can be modified in various ways as required.

The invention claimed is:

1. A control system comprising an air conditioner and a file server, the control system controlling the air conditioner,
   wherein the file server includes
      a lifestyle log in which information associating lifestyle information indicating a lifestyle with a control method of the air conditioner is accumulated, and
   wherein the air conditioner includes:
      processing circuitry configured to:
         acquire information in the lifestyle log from the file server,
         responsive to receipt of a first control request from a first device which communicates with the air conditioner through short-range wireless communication, operate the air conditioner according to the first control request, and
         responsive to receipt of a second control request from a second device which communicates with the air conditioner via a wireless local area network, select a control method from the lifestyle log based on the second control request and operate the air conditioner using the control method that has been selected, wherein the second device which has higher functionality than the first device accepts a control-operation for the air conditioner that cannot be accepted by the first device, as a control operation request.

2. The control system according to claim 1,
wherein the second device includes:
a memory to store attribute information of a user who uses the air conditioner; and
processing circuitry to:
display a request acceptance screen for accepting the control-operation for the air conditioner from the user as the control-operation request, and
upon accepting the control-operation request from the user through the request acceptance screen, transmit the second control request including the control-operation request and the attribute information of the user to the processing circuitry of the air conditioner.

3. The control system according to claim 2,
wherein the processing circuitry of the air conditioner extracts one or more control methods corresponding to lifestyle information indicating a lifestyle of the user from the lifestyle log, based on the attribute information of the user included in the second control request, and
selects a control method appropriate for the control-operation request included in the second control request from among the one or more extracted control methods, as a selected control method.

4. The control system according to claim 3,
wherein the processing circuitry of the air conditioner transmits the selected control method that has been selected to the second device,
wherein the processing circuitry of the second device displays a confirmation screen for making the user confirm whether or not the air conditioner can be operated by the selected control method, and transmits a confirmation result to the processing circuitry of the air conditioner, and
wherein the processing circuitry of the air conditioner controls the air conditioner using the selected control method when the confirmation result is yes.

5. The control system according to claim 2,
wherein the processing circuitry of the air conditioner extracts one or more control methods corresponding to lifestyle information indicating a lifestyle of the user from the lifestyle log, based on the attribute information of the user included in the second control request, and
extracts, as one or more control method candidates, one or more control methods appropriate for the control-operation request included in the second control request from among the one or more extracted control methods, and transmits the one or more control method candidates that have been extracted to the second device, and
wherein the processing circuitry of the second device displays a selection screen for selecting a control method from among the one or more control method candidates, and transmits a control method selected by the user through the selection screen to the processing circuitry of the air conditioner, as a selected control method, and
wherein the processing circuitry of the air conditioner controls the air conditioner using the selected control method.

6. The control system according to claim 1,
wherein the first device is a remote controller, or control-operation equipment that is provided in the air conditioner, and
wherein the second device is a personal computer, a smartphone, a mobile phone, or a tablet computer.

7. The control system according to claim 1,
wherein the air conditioner includes
a display which displays thereon whether the air conditioner is being operated by the first device or being operated by the second device.

8. An air conditioner that communicates with a file server,
the file server including a lifestyle log in which information associating lifestyle information representing a lifestyle with a control method of the air conditioner is accumulated,
the air conditioner comprising:
processing circuitry configured to:
acquire information in the lifestyle log from the file server,
responsive to receipt of a first control request from a first device which communicates with the air conditioner through short-range wireless communication, operate the air conditioner according to the first control request, an
responsive to receipt of a second control request from a second device which communicates with the air conditioner via a wireless local area network, select a control method from the lifestyle log based on the second control request and operate the air conditioner using the control method that has been selected,
wherein the second device which has higher functionality than the first device accepts a control-operation for the air conditioner that cannot be accepted by the first device, as a control operation request.

9. A control method of a control system that includes an air conditioner and a file server and controls the air conditioner,
the file server including a lifestyle log in which information associating lifestyle information indicating a lifestyle with a control method of the air conditioner is accumulated,
the control method comprising, at the air conditioner:
acquiring information in the lifestyle log from the file server,
responsive to receipt of a first control request from a first device which communicates with the air conditioner through short-range wireless communication, operating the air conditioner according to the first control request; and
responsive to receipt of a second control request from a second device which communicates with the air conditioner via a wireless local area network, selecting a control method from the lifestyle log based on the second control request and operating the air conditioner using the control method that has been selected,
wherein the second device which has higher functionality than the first device accepts a control-operation for the air conditioner that cannot be accepted by the first device, as a control operation request.

10. The air conditioner according to claim 8,
wherein the processing circuitry of the air conditioner receives, from the second device, the second control request including the control-operation request and attribute information of the user, indicating that the user accepted the control-operation for the air conditioner as the control-operation request.

11. The air conditioner according to claim 10,
wherein the processing circuitry of the air conditioner extracts one or more control methods corresponding to lifestyle information indicating a lifestyle of the user from the lifestyle log, based on the attribute information of the user included in the second control request, and
selects a control method appropriate for the control-operation request included in the second control request from among the one or more extracted control methods, as a selected control method.

12. The air conditioner according to claim 11,
wherein the processing circuitry of the air conditioner transmits the selected control method that has been selected to the second device,
wherein the processing circuitry of the air conditioner receives, from the second device, a confirmation result that indicates the user confirmed whether or not the air conditioner can be operated by the selected control method, and
wherein the processing circuitry of the air conditioner controls the air conditioner using the selected control method when the confirmation result is yes.

13. The air conditioner according to claim 10,
wherein the processing circuitry of the air conditioner extracts one or more control methods corresponding to lifestyle information indicating a lifestyle of the user from the lifestyle log, based on the attribute information of the user included in the second control request, and
extracts, as one or more control method candidates, one or more control methods appropriate for the control-operation request included in the second control request from among the one or more extracted control methods, and transmits the one or more control method candidates that have been extracted to the second device,
wherein the processing circuitry of the air conditioner receives a control method selected by the user through the selection screen, as a selected control method, and
wherein the processing circuitry of the air conditioner controls the air conditioner using the selected control method.

14. The air conditioner according to claim 8,
wherein the first device is a remote controller- or control-operation equipment that is provided in the air conditioner, and
wherein the second device is a personal computer, a smartphone, a mobile phone, or a tablet computer.

15. The air conditioner according to claim 8,
wherein the air conditioner includes
a display which displays thereon whether the air conditioner is being operated by the first device or being operated by the second device.

16. The control method according to claim 9, further comprising,
at the air conditioner, receiving, from the second device, the second control request including the control-operation request and attribute information of the user, indicating that the user accepted the control-operation for the air conditioner as the control-operation request.

17. The control method according to claim 16, further comprising, at the air conditioner,
extracting one or more control methods corresponding to lifestyle information indicating a lifestyle of the user from the lifestyle log, based on the attribute information of the user included in the second control request, and
selecting a control method appropriate for the control-operation request included in the second control request from among the one or more extracted control methods, as a selected control method.

18. The control method according to claim 17, further comprising, at the air conditioner,
transmitting the selected control method that has been selected to the second device,
receiving, from the second device, a confirmation result that indicates the user confirmed whether or not the air conditioner can be operated by the selected control method, and
controlling the air conditioner using the selected control method when the confirmation result is yes.

19. The control method according to claim 16, further comprising, at the air conditioner,
extracting one or more control methods corresponding to lifestyle information indicating a lifestyle of the user from the lifestyle log, based on the attribute information of the user included in the second control request, and
extracting, as one or more control method candidates, one or more control methods appropriate for the control-operation request included in the second control request from among the one or more extracted control methods, and transmits the one or more control method candidates that have been extracted to the second device,
receiving a control method selected by the user through the selection screen, as a selected control method, and
controlling the air conditioner using the selected control method.

20. The control method according to claim 9,
wherein the air conditioner includes a display, further comprising,
the air conditioner displaying on the display whether the air conditioner is being operated by the first device or being operated by the second device.

* * * * *